US010862567B2

(12) United States Patent
Li et al.

(10) Patent No.: US 10,862,567 B2
(45) Date of Patent: Dec. 8, 2020

(54) PER PACKET ANTENNA SWITCH DIVERSITY

(71) Applicant: Apple Inc., Cupertino, CA (US)

(72) Inventors: Lei Li, Sunnyvale, CA (US); Peter M. Agboh, Burlingame, CA (US); Xiaojun Chen, San Jose, CA (US); Qiyang Wu, Fremont, CA (US); Vusthla Sunil Reddy, Cupertino, CA (US); Mohit Narang, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 131 days.

(21) Appl. No.: 15/709,360

(22) Filed: Sep. 19, 2017

(65) Prior Publication Data

US 2018/0212669 A1     Jul. 26, 2018

Related U.S. Application Data

(60) Provisional application No. 62/450,052, filed on Jan. 24, 2017.

(51) Int. Cl.
*H04B 7/08* (2006.01)
*H04B 1/44* (2006.01)
(Continued)

(52) U.S. Cl.
CPC ............. *H04B 7/0814* (2013.01); *H04B 1/44* (2013.01); *H04B 7/0604* (2013.01); *H04B 7/0608* (2013.01); *H04B 17/12* (2015.01); *H04B 17/318* (2015.01); *H04L 5/1461* (2013.01); *H04W 72/0446* (2013.01)

(58) Field of Classification Search
None
See application file for complete search history.

(56) References Cited

U.S. PATENT DOCUMENTS 8,428,168 B1 * 4/2013 Zhang ................. H04B 7/0691
375/267
8,649,418 B1 * 2/2014 Negus ................. H04B 7/0486
375/211

(Continued)

OTHER PUBLICATIONS

DCP systems specifications: a low-cost flexible CDMA architecture for cordless and PCS applications. IEEE, 1994 all pages. (Year: 1994).*

*Primary Examiner* — Brandon M Renner
(74) *Attorney, Agent, or Firm* — Morgan, Lewis & Bockius LLP

(57) ABSTRACT

A wireless communication device includes a number of radio-frequency (RF) antennas and one or more radio circuits. Each radio circuit includes a receive (RX) chain to process RX signals and a transmit (TX) chain to process TX signals. An RF switch network couples at least one RF antenna to at least one radio circuit. A baseband processor controls a configuration of the RF switch network. The baseband processor determines a plurality of parameters and controls the RF switch network based on at least one of the parameters. The parameters are determined during a training interval including at least an inter-frame space (IFS). The configuration of the RF switch network is based on the determined parameters and is employed for selection of an antenna to improve a link performance when used for communication of a next packet following the IFS.

19 Claims, 15 Drawing Sheets

(51) Int. Cl.
  *H04B 7/06*      (2006.01)
  *H04L 5/14*      (2006.01)
  *H04B 17/12*     (2015.01)
  *H04B 17/318*    (2015.01)
  *H04W 72/04*     (2009.01)

(56) References Cited

U.S. PATENT DOCUMENTS

| | | | | |
|---|---|---|---|---|
| 2003/0078011 | A1* | 4/2003 | Cheng | H04B 1/0003 |
| | | | | 455/73 |
| 2005/0265503 | A1* | 12/2005 | Rofheart | G01S 7/023 |
| | | | | 375/354 |
| 2009/0290563 | A1* | 11/2009 | Gu | H04B 7/0608 |
| | | | | 370/338 |
| 2010/0144285 | A1* | 6/2010 | Behzad | H04B 1/40 |
| | | | | 455/73 |
| 2013/0035051 | A1* | 2/2013 | Mujtaba | H04B 7/0808 |
| | | | | 455/277.2 |
| 2014/0079145 | A1* | 3/2014 | Sampath | H04B 7/0811 |
| | | | | 375/260 |
| 2016/0119104 | A1* | 4/2016 | Rison | H04L 1/1671 |
| | | | | 370/329 |
| 2016/0218406 | A1* | 7/2016 | Sanford | H01Q 19/134 |
| 2017/0237292 | A1* | 8/2017 | Jeong | H02J 50/80 |
| | | | | 307/104 |
| 2018/0070364 | A1* | 3/2018 | Varanese | H04L 5/1461 |

* cited by examiner

| CH_NUM | CH_FREQ (MHZ) | TIME_STAMP (SLOT) | TARGET_ANT | RSSI_1 (DB) | RSSI_2 (DB) |
|---|---|---|---|---|---|
| 0 | 2402 | 0X0000A1 | 2 | -80 | -70 |
| 1 | 2403 | 0X000057 | 1 | -73 | -80 |
| 2 | 2441 | 0X0000A0 | 1 | -70 | -90 |
| 3 | 2442 | 0X000092 | 1 | -70 | -94 |
| ... | ... | | | | |
| 78 | 2480 | 0X000007 | 2 | -74 | -60 |

*FIG. 11A*

| USE_CASE | TXPWR_1 (DBM) | TXPWR_2 (DBM) | COMMENT |
|---|---|---|---|
| 1 | 3 | 4 | WIFI ON & CELL ON (DEFAULT) |
| 2 | 10 | 16 | WIFI ON & CELL OFF |
| 3 | 7 | 11 | WIFI ON & CELL OFF |
| 4 | 8 | 4 | WIFI ON & CELL ON |
| 5 | 0 | 0 | POWER SAVE MODE |
| ... | ... | ... | ... |

*FIG. 11B*

PER PACKET ANTENNA SWITCH DIVERSITY

CROSS-REFERENCE TO RELATED APPLICATIONS

This application claims the benefit of priority under 35 U.S.C. § 119 from U.S. Provisional Patent Application 62/450,052 filed Jan. 24, 2017, which is incorporated herein by reference in its entirety.

TECHNICAL FIELD

The present description relates generally to wireless communications, including to per packet antenna switch diversity.

Today's mobile communication devices, such as phones, tablets, and phablets, are equipped with high-speed links capable of providing high definition video and/or high data-rate communications. Mobile communication devices use various communication technologies that are based on one or more of a number of wireless communications standards, such as GSM, WCDMA, LTE, Wi-Fi, WiMAX, Bluetooth, and others. Many mobile communication devices are equipped with multiple radio-frequency (RF) antennas that in combination with implemented radio and baseband processors make them capable of communicating over more than one wireless communication standard. For example, a wireless device may communicate with a base station using a cellular protocol (e.g., LTE) and with other devices using a different wireless protocol, such as Wi-Fi or Bluetooth.

An antenna switch is implemented to facilitate selection of an antenna among multiple antennas for transmit (TX) or receive (RX) operations. Currently, antenna switching is based on weighted signal-to-noise ratio (SNR). SNR at each active antenna may be calculated and weighted with a specific weight that can be antenna-specific, radio specific, and/or TX or RX specific. However, switch diversity can be achieved only when a suitable TX-RX antenna pair is used simultaneously at both transmitter and receiver.

BRIEF DESCRIPTION OF THE DRAWINGS

Certain features of the subject technology are set forth in the appended claims. For purposes of explanation, several embodiments of the subject technology are set forth in the following figures.

FIG. 11A is a table illustrating example values of receiver signal strength indicator (RSSI) versus frequency and time, in accordance with one or more aspects of the subject technology.

FIG. 11B is a table illustrating example values of per-antenna TX power, in accordance with one or more aspects of the subject technology.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced without one or more of the specific details. In some instances, structures and components are shown in block diagram form to avoid obscuring the concepts of the subject technology.

In one or more aspects of the subject technology, per packet antenna switch diversity training (and implementation) is provided. The subject technology allows accurate and fast prediction for selection of transmit (TX) and receive (RX) antenna pairs at both transmitter and receiver devices and for forward and reverse links. The per packet switch diversity training of the subject disclosure can improve range, throughput, and other performance characteristics of the transmitter and receiver devices, including under fast fading, for example, when either or both of the transmitter and/or the receiver device is moving. The subject technology is compatible with a number of communication protocols, for example, Bluetooth (BT), Wi-Fi, NFC, and other wireless technologies.

Figure 1:
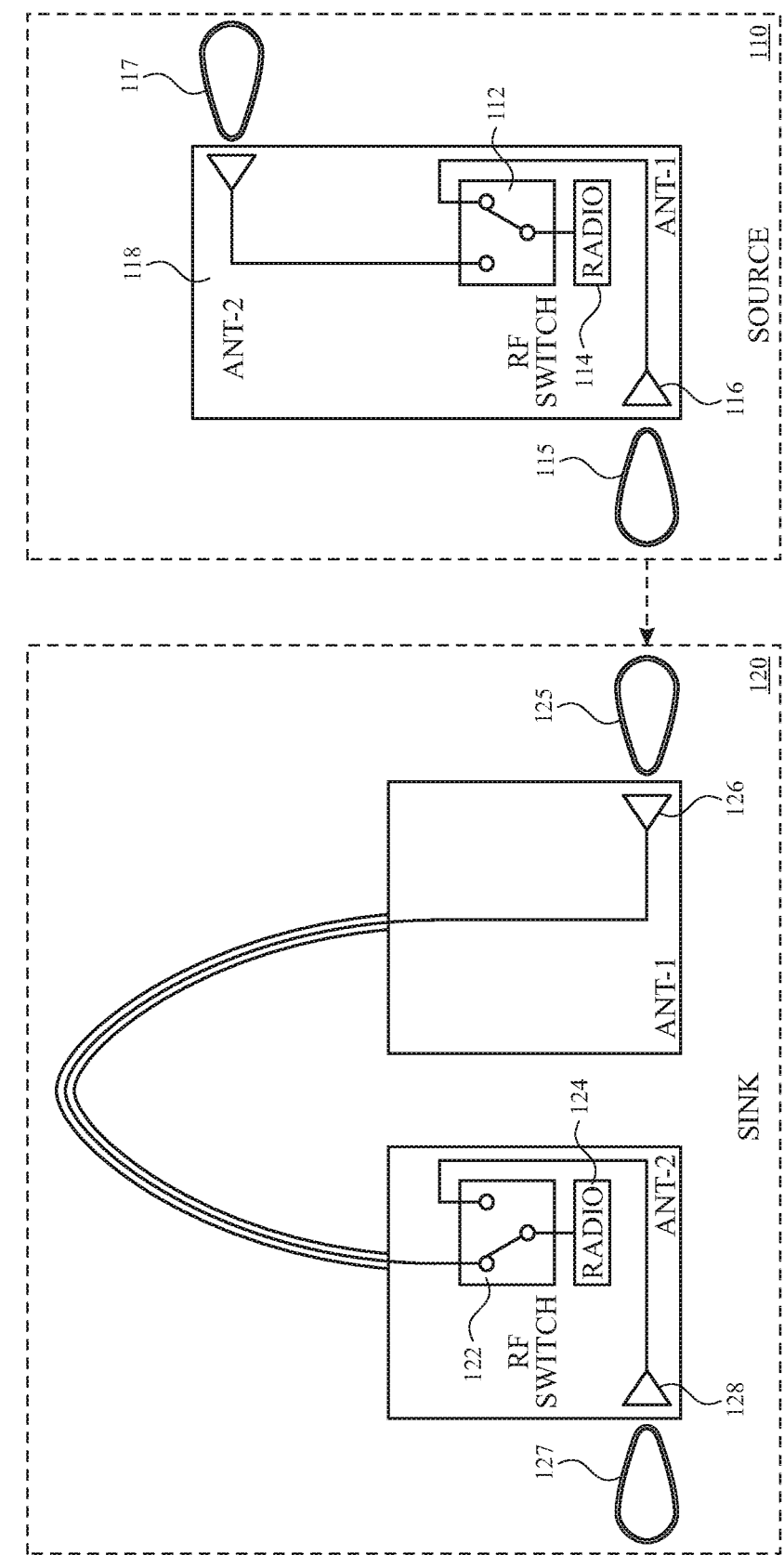
FIG. 1 is a high-level diagram illustrating an example of a communication system, in accordance with one or more aspects of the subject technology.

FIG. 1 is a high-level diagram illustrating an example of a communication system 100, in accordance with one or more aspects of the subject technology. The communication system 100 includes a first communication device 110 (e.g., a source) and a second communication device 120 (e.g., a sink) in wireless communication with the first communication device. The first communication device 110 includes a radio-frequency (RF) switch network 112, a radio circuit 114, a first RF antenna 116 with a radiation pattern 115, and a second RF antenna 118 with a radiation pattern 117. The RF switch network 112 can be configured to couple (directly or indirectly) one of the first RF antennas 116 or the second RF antenna 118 to the radio circuit 114. In some embodiments, the first communication device 110 may include two or more RF antennas and two or more radio circuits, in which case the RF switch network 112 may be configurable to selectively couple one of the RF antennas to one of the radio circuits.

The second communication device 120 includes an RF switch network 122, a radio circuit 124, a first RF antenna 126 with a radiation pattern 125, and a second RF antenna 128 with a radiation pattern 127. In some embodiments, the first communication device 110 can be a hand-held communication device, such as a cell phone, a tablet, a phablet, or another hand-held communication device in wireless communication (e.g., Bluetooth) communication with the second communication device. Further, the second communication device 120 can be, for example, a headset or another accessory device capable of wireless communication (e.g., Bluetooth). In at least some embodiments, an objective of the subject technology is to select one of the antennas of the communication device 110 as a transmit (TX) or a receive (RX) antenna and one of the antennas of the second communication device 120 as the RX or the TX antenna for providing a desired or improved link between the first and the second communication devices 110 and 120.

As the relative positions of the antennas of the first and second communication devices 110 and 120 can change with movement, the selection of the respective antennas that can provide the desired link is a dynamic process, as described in more details herein. For example, in the scenario shown in FIG. 1, the first RF antenna 116 of the first communication device 110 should be selected as the TX antenna and the first RF antenna 126 of the second communication device 120 should be selected as the RX antenna to achieve improved communication link performance.

The existing antenna selection solutions are mainly based on long-term link statistics using estimation of one or more system parameters, such as signal-to-noise ratio (SNR) and/or receiver signal strength indicator (RSSI). However, these existing solutions may not work well for a rapidly changing communication environment (e.g., having fast fading) due to their inability to accurately and quickly predict the best antennas to use at both transmitter and receiver at the time of an individual transmission. As a result, one or more antennas may be selected that result in degraded link performance relative to a different antenna pair, for example, in terms of packet loss. To reduce or prevent link performance degradation in fast fading signal environments, the subject disclosure, as described herein, provides per-packet antenna switch diversity algorithms and system implementations that can overcome the shortcomings of the existing solutions.

Figure 2:
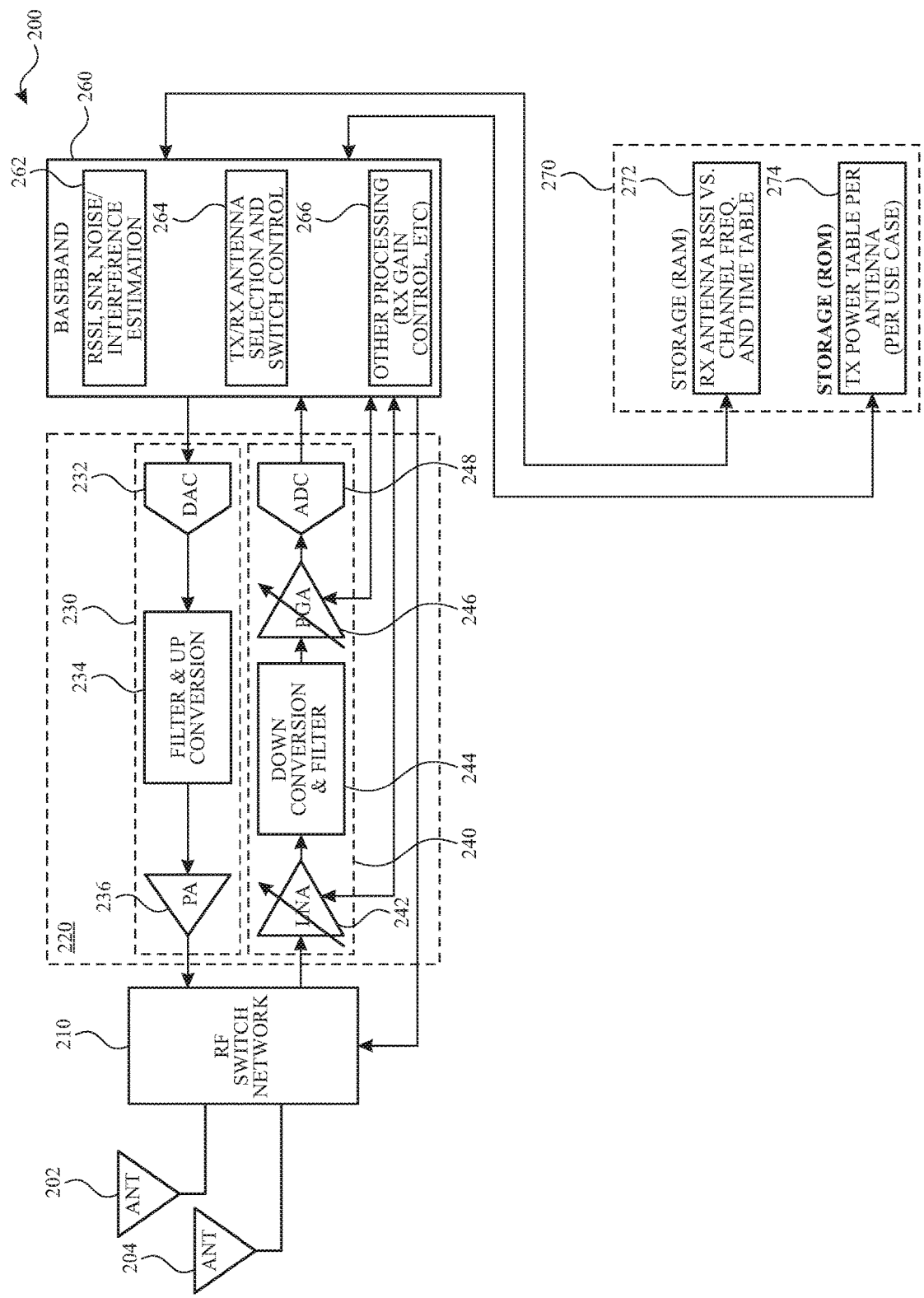
FIG. 2 presents a block diagram of an example communication device configured to implement per-packet antenna training, in accordance with one or more aspects of the subject technology.

FIG. 2 illustrates an example block diagram of an example of a communication device 200, configured to implement per-packet antenna training/selection schemes, in accordance with one or more aspects of the subject technology. The communication device 200 includes RF antennas 202 and 204, an RF switch network 210, a radio circuit (e.g., transceiver) 220, a baseband processor 260, and a storage 270. In some embodiments, communication device 200 may have multiple RF antennas and more than one radio circuit, for example, to implement different wireless communication protocols (e.g., Bluetooth, Wi-Fi, LTE, etc.). The RF switch network 210 can be configured (e.g., by the baseband processor 260) to communicatively couple one of the RF antennas (e.g., one of 202 or 204) to one of the radio circuits (e.g., 220).

The radio circuit 220 includes a transmit (TX) chain (path) 230 and a receive chain (path) 240. The TX chain 230 includes a digital-to-analog converter (DAC) 232, a filter and up-conversion circuit 234, and a power amplifier (PA) circuit 236, but is not limited to these components. The DAC 232 can receive digital baseband signals from the baseband processor 260 and convert the digital baseband signals to analog signals. The analog signals can be modulated baseband signals that are filtered and up-converted to RF signals by the filter and up-conversion circuit 234, and amplified by the PA circuit 236. The amplified RF signals are sent via the RF switch network 210 to a selected one of the RF antennas 202 or 204 for transmission.

The receive chain (path) 240 includes a low-noise amplifier (LNA) 242, a down-conversion and filter circuit 244, a programmable gain amplifier (PGA) 246, and an analog-to-digital converter (ADC) 248. The LNA 242 receives RF signals from a selected one of the RF antennas 202 or 204, via the RF switch network 210, and amplifies the received RF signal. The amplified RF signal is down-converted to a baseband signal through the down-conversion and filter circuit 244 and further amplified and amplitude adjusted by the PGA 246 before reaching the ADC 248. The gain of either/both of the LNA 242 and the PGA 246 can be controlled by the baseband processor 260, e.g., to prevent the ADC 248 from overflowing. The ADC 248 converts the baseband signal from analog to digital format suitable for processing by the baseband processor 260.

The baseband processor 260 includes a number of sub-modules, for example, an interference estimation sub-module 262, an antenna selection and switch control sub-module 264, and other processing sub-module 266. The interference estimation sub-module 262 can determine values of a number of parameters (e.g., RF parameters) including any/all of RSSI, SNR, noise/interference, and/or other parameters, and can provide corresponding information for a per-packet antenna diversity implementation. The estimation of the one or more parameters can take place during a training interval, such as an inter-frame space (IFS), as discussed in more detail below.

The switch control sub-module 264 may send control signals to the RF switch network 210 to control configuration of the RF switch network 210. Control of the configuration of the RF switch network 210 can be performed with respect to values of one or more of the parameters determined by the interference estimation sub-module 262. The configuration of the RF switch network 210 allows suitable selection of TX and RX antennas among the RF antennas of the communication device 200 and/or a remote communication device that is in wireless communication with the communication device 200.

The baseband processor 260 performs a number of baseband processing operations, including via the other processing sub-module 266. For example, the other processing sub-module 266 can be perform modulation and demodulation of the baseband signal, control the gain of the amplifiers in the RX chain 240 (e.g. LNA 242 and PGA 246), and perform other control and processing activities. The baseband processor 260 can be implemented in hardware, firmware, and/or may be partially implemented in software, in some embodiments.

The storage 270 includes random-access memory (RAM) 272 and read-only memory (ROM) 274, but is not limited to these types of storage and can include other memory types.

For example, the RAM 272 can store information such as RX chain related information including RX antenna RSSI information. The RSSI information can include, but is not limited to, RSSI versus frequency information and RSSI versus time information (e.g., tables). The ROM 274, for example, can store TX chain related information including TX power information. The TX power information can include, but is not limited to, TX power per antenna (e.g., TX power tables including per use case) information.

Returning to the baseband processor 260, a per packet SNR-based antenna switch diversity scheme for a TX-RX antenna pair for both forward and reverse links can be executed by the baseband processor 260. A training process can be implemented during a usable training interval, such as an inter-frame space (IFS) time or unused slot before a standard packet, using estimated channel conditions, without impacting a standard compliant operation block. Generalized antenna selection algorithms described herein can work for any type of antenna and various switch network configurations. During the training interval, the baseband processor 260 can execute a training scheme to transmit or receive one or more antenna training packets. The training scheme can include a transmitter-initiated training (TIT) scheme and a receiver-initiated training scheme. The transmitter-initiated training scheme is executed to facilitate one of a TX antenna selection of the communication device 200 and an RX antenna selection of a remote device (e.g., the second communication device 120 of FIG. 1), as described in more details below. The baseband processor 260 may execute the receiver-initiated training scheme to train the TX antenna selection of the remote device, as explained in more details herein.

The disclosed solution can provide accurate and fast prediction for best TX-RX antenna pairs at both transmitter and receiver and for forward and reverse links and optimal switch diversity gain including, for example, improved range, throughput, performance under fast fading, and other advantageous features. The subject technology can be applied to various wireless communication technologies such as, Bluetooth, Wi-Fi, NFC, and other wireless technologies.

The RF parameters determined by the baseband processor 260 are used for an optimal antenna selection algorithm are explained herein. The RF parameters include M choices of antenna selections from V antennas at local device (e.g., communication device 200), and I choices of antenna selection from U antennas at a remote device (e.g., a remote communication device). Without loss of generosity, RX antenna selection scheme m (in which antenna m is selected locally) and TX antenna selection scheme m (in which antenna m is selected from U antennas at a remote device) are the same. The RF parameters further include local device RF parameters calculated prior to or during training packet reception including $txpwr_{local\{m\}}$, $noise_{local\{m\}}$, $rssi_{local\{m\}\{i\}}$, and $snr_{local\{m\}\{i\}}$ for transmission from the remote TX antenna scheme $i \in \{1, 2, \ldots, I\}$, respectively. The $txpwr_{local\{m\}}$ parameter defines a TX power for local TX antenna scheme (index) $m \in \{1, 2, \ldots, M\}$. The $noise_{local\{m\}}$ parameter defines noise and interference received for local Rx antenna scheme m. The $rssi_{local}\{m\}\{i\}$ defines RSSI (e.g., associated with signal excluding noise) and SINR for RX antenna (selection) scheme $m \in \{1, 2, \ldots, M\}$. The RSSI parameter is related to a parameter S with the relation $RSSI = 10 \log_{10}(S)$. Accordingly, $S_{local\{m\}\{i\}}$ may be used below for $rssi_{local\{m\}\{i\}}$.

The RF parameters further include remote device RF parameters sent to local device via a training packet and include txpwr_plus_noise_delta parameter that defines TX power plus estimated noise/interference for remote antenna scheme i and $noise_{remote\{i\}}$ (or $n_{remote\{i\}}$) that defines the estimated noise/interference for remote antenna scheme i.

The disclosed antenna selection algorithm for optimal antenna switch diversity, for p, $m \in \{1, 2, \ldots, M\}$ and k, $i \in \{1, 2, \ldots, I\}$ is based on the following equations described herein.

For transmission from remote TX antenna scheme k to local Rx antenna scheme p:

$$(p,k) = \mathrm{argmax}(snr_{local}\{p\}\{k\}) \qquad (\text{Eq. 1})$$

For transmission from local TX antenna scheme m to remote RX antenna scheme i:

$$(i,m) = \mathrm{argmax}(snr_{remote1}\{i\}\{m\}) \qquad (\text{Eq. 2})$$

Where $snr_{remote1}\{i\}\{m\})$ is the estimated SNR for remote antenna scheme i for transmission from local antenna scheme m and is given as:

$$snr_{remote1}\{i\}\{m\}) = r_{remote\{i\}} \cdot H \cdot \mathrm{diag}(t_{local\{m\}}) \cdot p_{local} / n_{remote} \qquad (\text{Eq. 3})$$

Where H is the U-by-V channel coefficient magnitude matrix, of which the element h{m}{i} at m-th row and i-th column is the path-loss from TX antenna scheme i to RX antenna scheme m, and $h\{m\}\{i\} = S_{local\{m\}\{i\}}/p_{remote\{i\}}$. It is understood that $h\{m\}\{i\} = h\{i\}\{m\} = S_{remote\{i\}\{m\}}/p_{local\{m\}}$ due to channel reciprocity. The term $t_{local\{m\}}$ in Eq. 3 is a 1-by-V local TX antenna selection row vector consisting of 1 and/or 0s, for TX antenna scheme m. The element at v-th location of this vector indicates whether the antenna i is selected for the transmit antenna scheme m, and 1 or 0, respectively represent situation when the antenna i is selected or not selected. For example $t\{5\} = [1, 0, \ldots, 0, 1]$ indicate that only the first and the last antennas are selected for antenna (selection) scheme 5, and the operator diag in diag ($t_{local\{m\}}$) returns a square diagonal matrix with the elements of vector $t_{local\{m\}}$) being the main diagonal elements of the square diagonal matrix. The term $r_{remote\{i\}}$ in Eq. 3 represents a 1-by-U receive antenna selection scheme row vector at remote, $p_{local}$ is per V-by-1 antenna TX power column vector, and $p_{local} = [p_{local}\{1\}, p_{local}\{2\}, \ldots, p_{local}\{v\}]^T$, where $p_{local\{v\}}$ is the TX power for v-th local antenna, and the operator T represents the matrix transpose operation block.

Using the above equations and after a number of mathematical substitutions and manipulations, For transmission from local TX antenna scheme m to remote RX antenna scheme i:

$$(i,m) = \mathrm{argmax}(rssi_{local\{m\}} + txpwr_{local\{m\}} - txpwr\_plus\_noise\_delta_{remote\{i\}}) \qquad (\text{Eq. 4})$$

Where $m \in \{1, 2, \ldots, M\}$ and $i \in \{1, 2, \ldots, I\}$.

For transmission from local TX antenna scheme n to the same remote RX antenna scheme:

$$n = \mathrm{argmax}(rssi_{local\{n\}} + txpwr_{local\{n\}}) \qquad (\text{Eq. 5})$$

where $n \in \{1, 2, \ldots, M\}$.

The above equations (Eq. 1-5) can be used in the transmitter and receiver per-packet antenna training schemes discussed below.

Figure 3A:
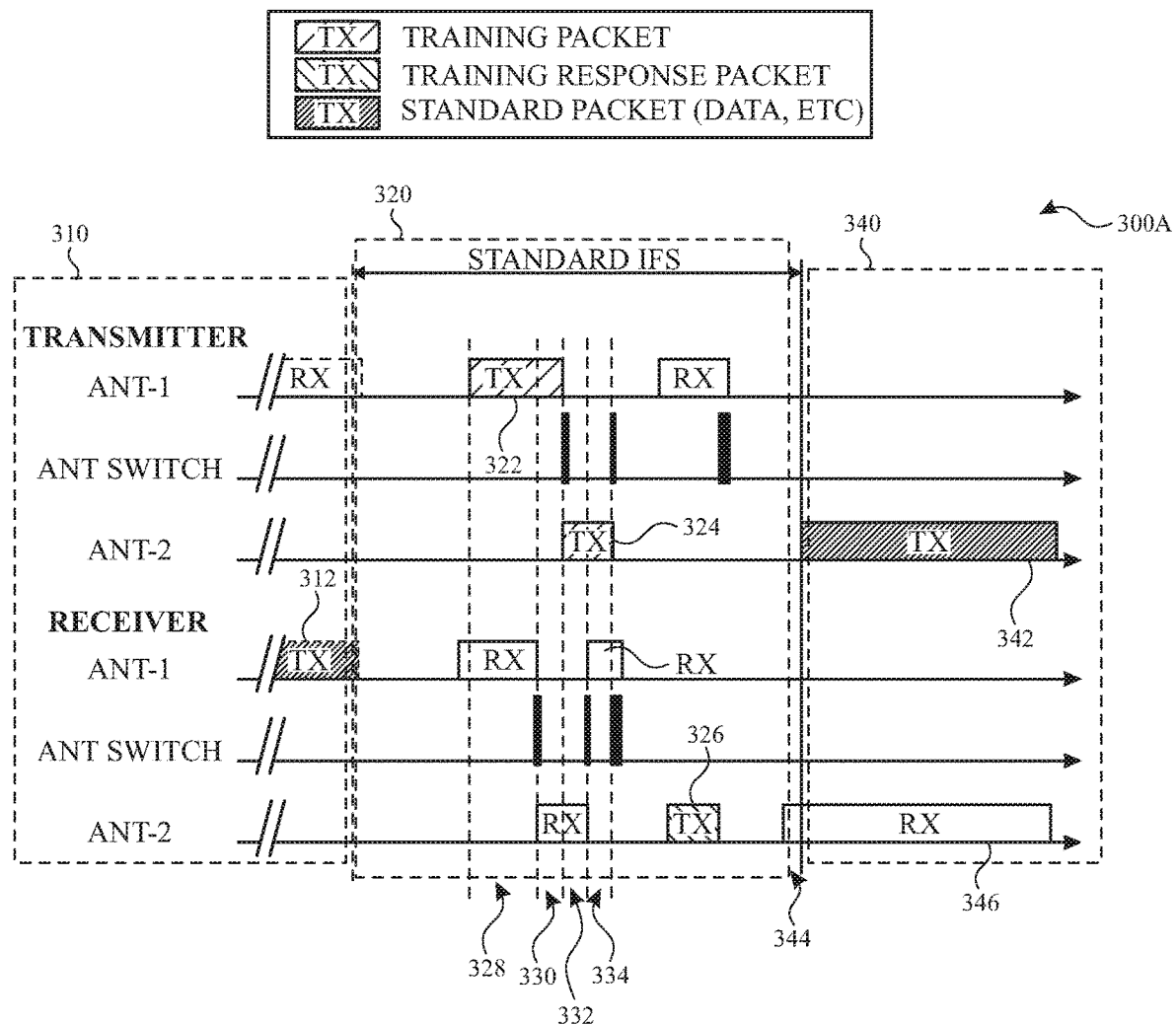
FIGS. 3A-3B illustrate diagrams of exemplary transmitter and receiver per-packet antenna training schemes, in accordance with one or more aspects of the subject technology.
Figure 3B:
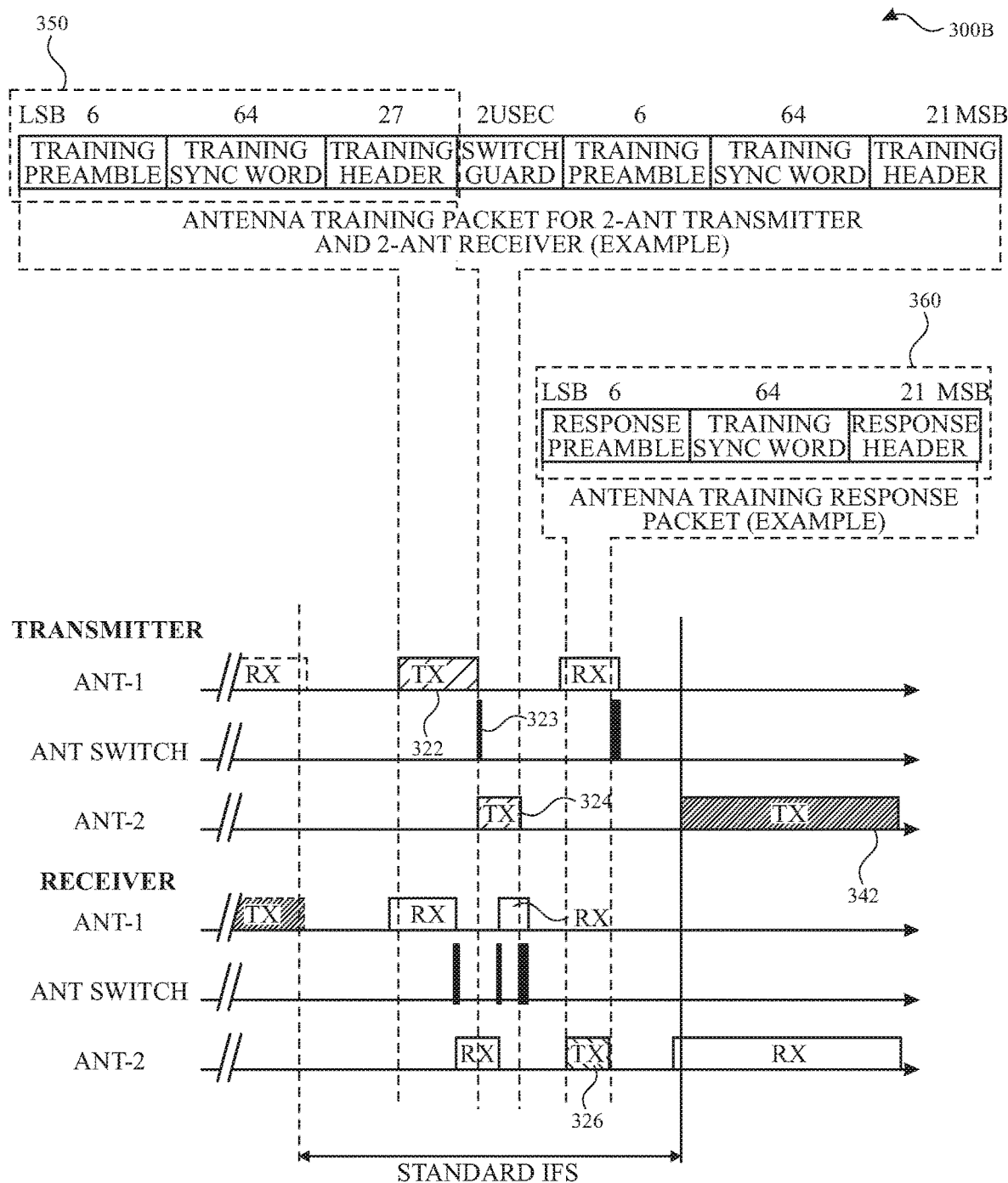

FIGS. 3A-3B illustrate diagrams of exemplary transmitter and receiver per-packet antenna training schemes 300A-300B, in accordance with one or more aspects of the subject technology. The per-packet antenna training schemes (hereinafter "training schemes") 300A and 300B apply to the communication system 100 of FIG. 1, where each of the first and second communication devices includes two RF antennas. In the training scheme 300A, of FIG. 3A, a training time interval 320, is an IFS between frame time slots 310 and 340. In the frame time slot 310, the Ant-1 of the transmitter (e.g., 116 of FIG. 1) is the default RX antenna and Ant-1 of the receiver (e.g., 126 of FIG. 1) is the default TX antenna and transmits the standard packet 312. It is noted that the term "standard" in the context of the present disclosure refers to normal packets communicating actual data (e.g., an audio stream), as opposed to the training packets that are communicated for the purpose of antenna training. In the frame time slot 340, which is used to communicate a standard frame, Ant-2 of the transmitter (e.g., 118 of FIG. 1) is the TX antenna and transmits the standard packet 342, and Ant-2 of the receiver (e.g., 128 of FIG. 1) is the RX antenna and can receive the packet 346.

During a time window 328 of the training time interval 320, the Ant-1 of the transmitter transmits a training packet 322 that can be received by the Ant-1 of the receiver. In the next time window 330, after a receiver antenna switch period, the Ant-2 of the receiver becomes the RX antenna. In a subsequent time window 332, following a transmitter antenna switch period, the Ant-2 of the transmitter takes over as the TX antenna and transmits a training packet 324 that can be received by the Ant-2 of the receiver. In the next time window 334, after a receiver antenna switch period, the Ant-1 of the receiver becomes the RX antenna. Finally, after a receiver antenna switch period, the Ant-2 of the receiver transmits the TX training response packet 326. After the training packets, the receiver responds the transmitter using its best antenna, and asks the transmitter to use its best antenna for both forward and reverse links in the subsequent transmissions. More discussion on the training packets and the information they carry are provided below.

In the training scheme 300B, of FIG. 3B, a sequence of training and training response packets are similar to the training scheme 300A explained above. The structure of a training packet 350 and a training response packet 360 are shown in FIG. 3B. The training packet 350 includes a training preamble (6 bits), a training Sync word (64 bits), and a training header (27 bits), and is followed by a switch guard period (e.g., about 2 μsec), which separates two consequent training packets. The training preamble can be either 101010 or 010101 depending on whether the least significant bit (LSB) of the following training sync word is 1 or 0, respectively. The training sync word is used for synchronization and RSSI and/or SNR estimation. The training sync word can be designed using pseudorandom numbers (PN) code with good auto- and cross-correlation such as the known Gold Codes to improve RSSI/SNR estimation accuracy. One example is to use the reverse order of standard Bluetooth Sync word, which does not interfere and coexist with standard Bluetooth operation block and has the same correlation property as the standard packet. The training header includes of 3 fields, with ⅓ rate FEC encoded, a slave ID field (3 uncoded bits), a training scheme field (2 uncoded bits), and a transmitter TX power plus noise delta field (4 uncoded bit). The slave ID field indicates which slave the packet is transmitted to or from, such that only intended slave (or master) may respond. The training scheme field includes a TIT-{I, II, III, IV} scheme or RIT-{I, II} scheme as explained below. The transmitter TX power plus noise delta field indicates the transmitter side TX power plus noise delta between antennas for reverse link (e.g., slave-to-master) estimation at the receiver. The switch guard (e.g., about 2 μsec) is the time interval needed for antenna switch.

As seen from FIG. 3B, the two consecutive training TX packet 322 and 324 are separated by the switch guard 323.

The TX training response packet 360 (e.g., 326) includes a response preamble (6 bits), a response sync word (64 bits), and a response header (21 bits). The response preamble and the response sync word are the same as training preamble and the training sync word described above. The response header includes 3 fields, with ⅓ rate FEC encoded, a slave ID field (3 uncoded bits), a forward link antenna selection scheme indices field (2 uncoded bits), and a reverse link (slave to master) antenna selection scheme (2 uncoded bit). The slave ID field indicates which slave the packet is transmitted to or from, such that only intended slave (or master) may respond. In the forward link antenna selection scheme indices field, the first bit is the master side TX antenna scheme index (e.g., m in Eq. 2), and the second bit is the slave side RX antenna scheme index (e.g., i in Eq. 2). In the training reverse link antenna selection scheme the 1st bit is the slave side TX antenna scheme index (e.g., k in Eq. 1), and 2nd bit is the master side RX antenna scheme index (e.g., p in Eq. 1).

In some embodiments, packet fields may be expanded to provide more control, add CRC protection, or other features, or may be reduced if certain parameter is not critical. Depending on the hardware transmit and receive timing, training packet may be simplified to fit into standard IFS. For example, the training packet can be as simple as short repetition of 1's and 0's (e.g., "1010"). In some embodiments, the training packet uses the same frequency as the frequency of the immediate following standard packet. When there is no time to fit the training response packet during IFS, the antenna selection schemes info may be sent back via the standard packet (e.g., using the header or payload bits) in the following slot. In some embodiments, other or improved Gaussian frequency-shift keying (GFSK) modulation techniques may be used to reduced air time or improve estimation for the training and training response packets.

Figure 4A:
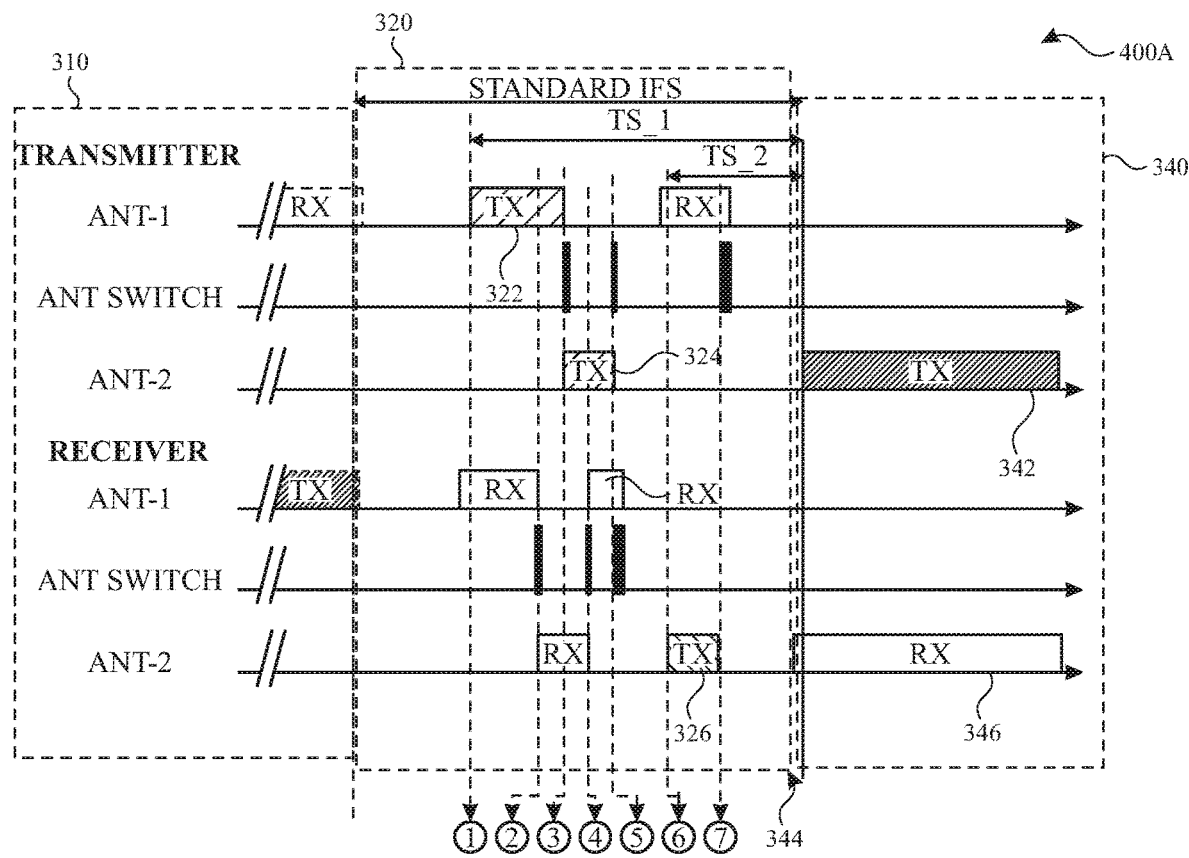
FIGS. 4A-4D illustrate diagrams of exemplary transmitter-initiated training (TIT) schemes, in accordance with one or more aspects of the subject technology.

FIGS. 4A through 4D illustrate diagrams of exemplary transmitter-initiated training schemes 400A through 400D, in accordance with one or more aspects of the subject technology. In the transmitter-initiated training schemes 400A through 400D various algorithms are followed at different time instances labeled with encircled numbers (e.g., 1 through 7 in FIG. 4A), which are described below. The transmitter-initiated training schemes 400A of FIG. 4A is a TIT-I scheme, in which both transmitter and receiver antenna training is performed.

At a time instance (1), on the transmitter side, noise/interference per antenna is estimated, and the transmitter_txpwr_plus_noise_detla parameter is generated and imbedded in the corresponding field in the TX training packet 322 for transmission. The TX training packet 322 is transmitted from Ant-1 of the transmitter at the designated timing ts-1 within the IFS 320. On the receiver side, the training packet received by Ant-1 of the receiver and estimates of $snr_{local\_11}$, $rssi_{local\_11}$, and $noise_{local\_11}$ are prepared.

At a time instance (2), on the receiver side, the active antenna is switched from Ant-1 to Ant-2, and the reception of the TX training packet 322 continues and estimates of $snr_{local\_21}$, $rssi_{local\_21}$, $noise_{local\_21}$ are prepared. The parameter transmitter_txpwr_plus_noise_detla is obtained from the TX training packet 322.

At a time instance (3), on the transmitter side, the active antenna is switched from Ant-1 to Ant-2 and transmission continues by transmitting the TX training packet 324. On the Receiver side, estimates of parameters $snr_{local\_22}$, $rssi_{local\_22}$, and $noise_{local\_22}$ are prepared.

At a time instance (4), on the receiver side, the active antenna is switched from Ant-2 to Ant-1, the receiver continues to receive the TX training packet 324 and prepares estimates of parameters $snr_{local\_12}$, $rssi_{local\_12}$, and $noise_{local\_12}$, and obtains from the TX training packet 324 transmitter_txpwr_plus_noise_detla, if failed to obtain it from the TX training packet 322.

At a time instance (5), on the receiver side, antenna selection schemes for the following scenarios (a, b, and c) are calculated according to the above discussed equations: (a) from remote TX antenna scheme k to local Rx antenna scheme p, according to (Eq. 1) above, (b) from local TX antenna scheme m to remote Rx antenna scheme i, according to (Eq. 2) above, and (c) from local TX antenna scheme n to send training response packet, according to (Eq. 5) above.

At a time instance (6), on the receiver side, the antenna selection schemes are embedded, as in scenarios (a) and (b) of the time instance (5), in the corresponding fields in the TX training response packet 326. At designated timing ts_2 prior to standard packet transmission (e.g., 344), the TX training response packet 326 is sent using local Tx antenna scheme n. On the transmitter side, the TX training response packet 326 is received and the Tx antenna scheme k and Rx antenna scheme i are used for future transmission and reception, respectively.

At a time instance (7), on the receiver side, the RX antenna scheme p, and TX antenna scheme m are used for future reception and transmission, respectively. On the transmitter side, the TX antenna scheme k is used to transmit the upcoming standard packet (e.g., 342).

Figure 4B:
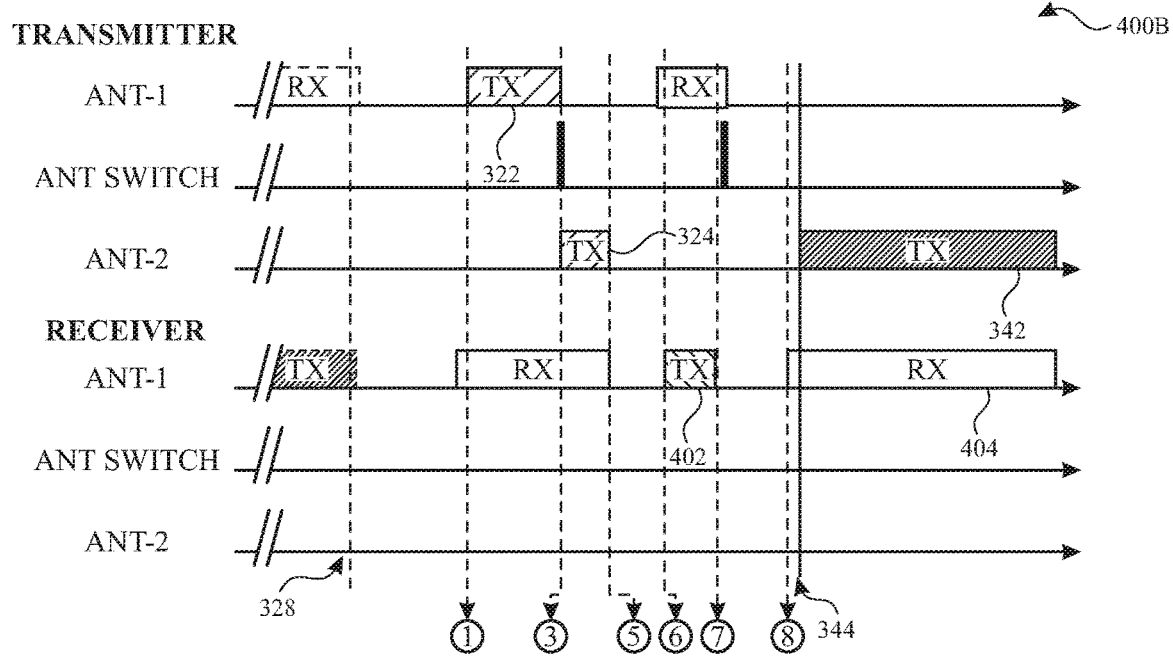

The transmitter-initiated training scheme 400B of FIG. 4B is a TIT-II scheme that is a variation of the transmitter-initiated training schemes 400A discussed above. In the transmitter-initiated training schemes 400B transmitter antenna training is performed during the IFS 320 and receiver antenna may not need training or implicit training can be used during standard packet (e.g., 346) reception at the time instance (8), the algorithm of which is fully described with respect to FIG. 9 below.

Figure 4C:
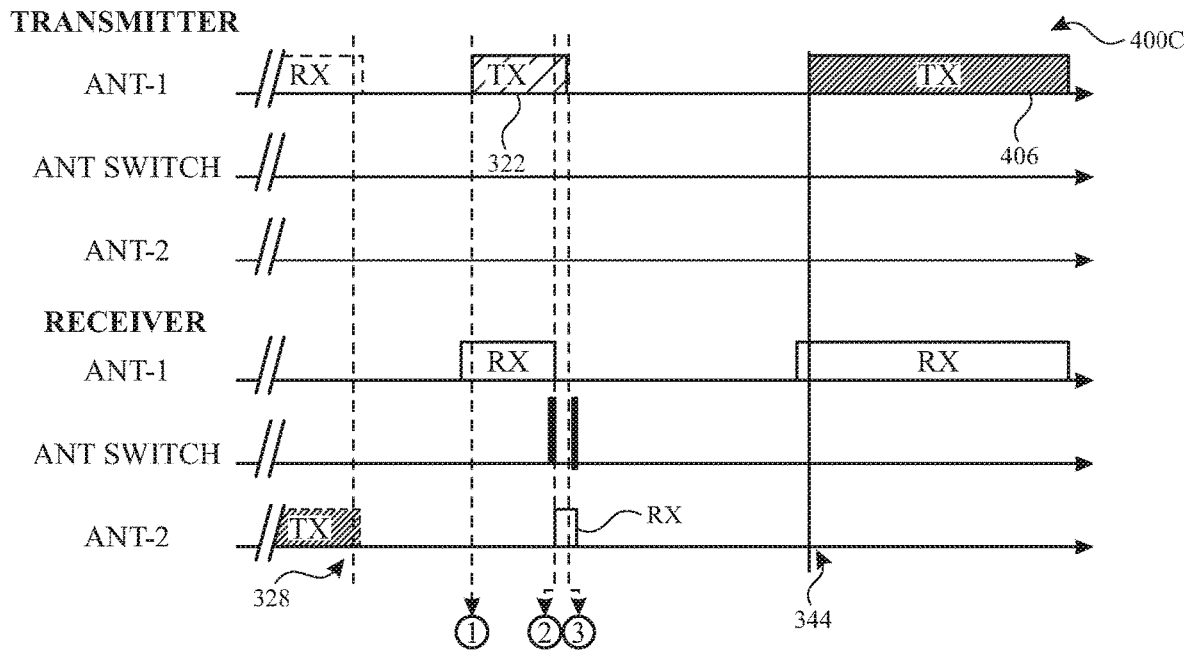

The transmitter-initiated training schemes 400C of FIG. 4C is a TIT-III scheme that is a second variation of the transmitter-initiated training schemes 400A discussed above, in which only the receiver antenna training algorithms corresponding to time instances (1), (3), and (3) are used.

Figure 4D:
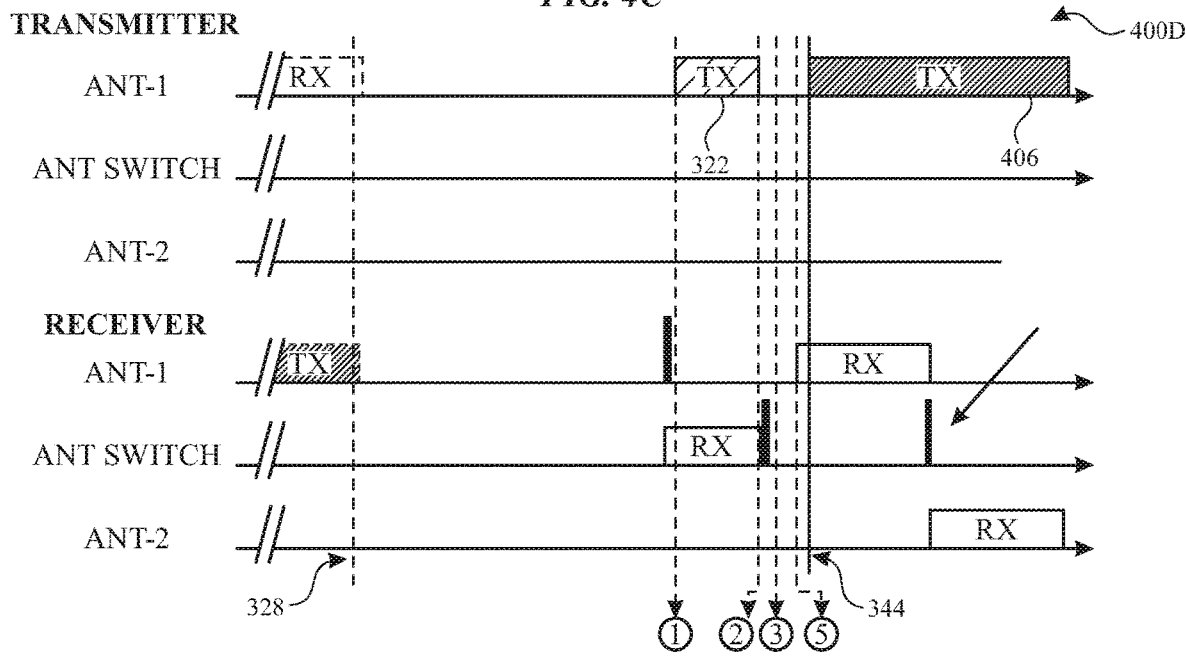

The transmitter-initiated training schemes 400D of FIG. 4D is a TIT-IV scheme that is a third variation of the transmitter-initiated training scheme 400A discussed above, in which only the receiver antenna training algorithms corresponding to time instances (1), (3), (3), and (5) are used. The transmitter-initiated training schemes 400D can provide an opportunity to inspect the other and/or the non-default receiver antenna, and if non-default antenna is good enough can continue to receive on the non-default antenna. Accordingly, only algorithms corresponding to some of the time instances (e.g., (1), (2), (3), and (5)) of the transmitter-initiated training schemes 400A may be used with slight modifications.

Figure 5:
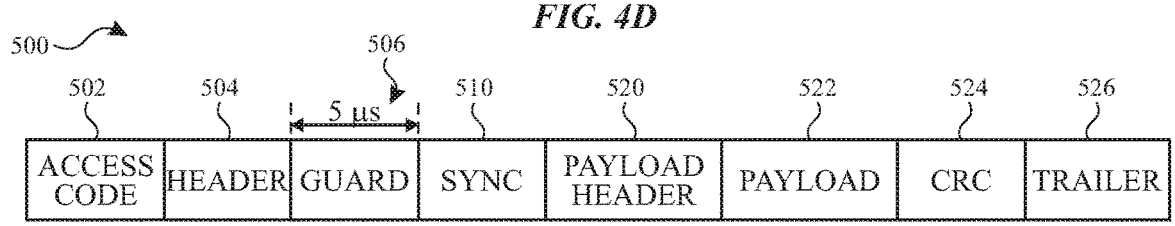
FIG. 5 is a diagram illustrating an example of a Bluetooth enhanced data rate (EDR) frame, in accordance with one or more aspects of the subject technology.

FIG. 5 is a diagram illustrating an example of a Bluetooth enhanced data rate (EDR) frame 500, in accordance with one or more aspects of the subject technology. In the EDR frame 500 includes an access code field 502, a header field 504, a guard filed 506, a sync field 520, a payload field 522, CRC field 524, and a trailer field 526, which are known fields. The guard filed 506 has a duration of about 5 μsec and provides an antenna switch opportunity.

Figure 6A:
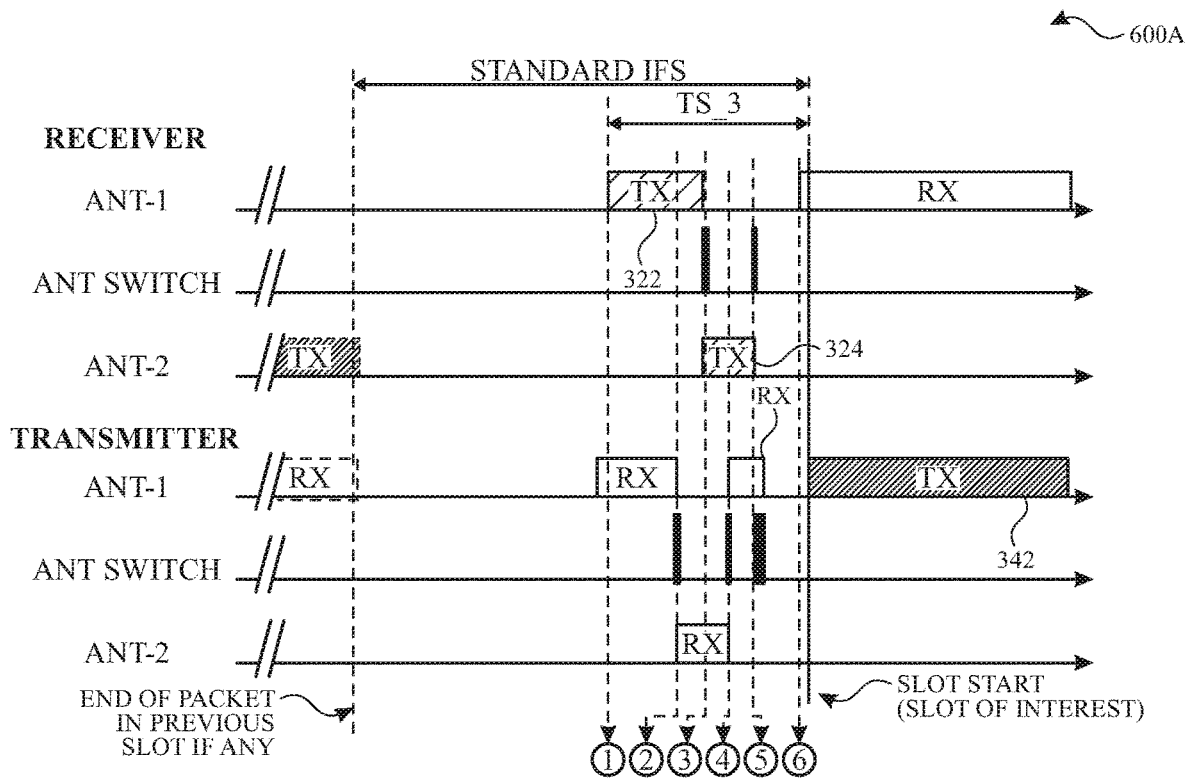
FIGS. 6A-6B illustrate diagrams of exemplary receiver-initiated training (RIT) schemes, in accordance with one or more aspects of the subject technology.
Figure 6B:
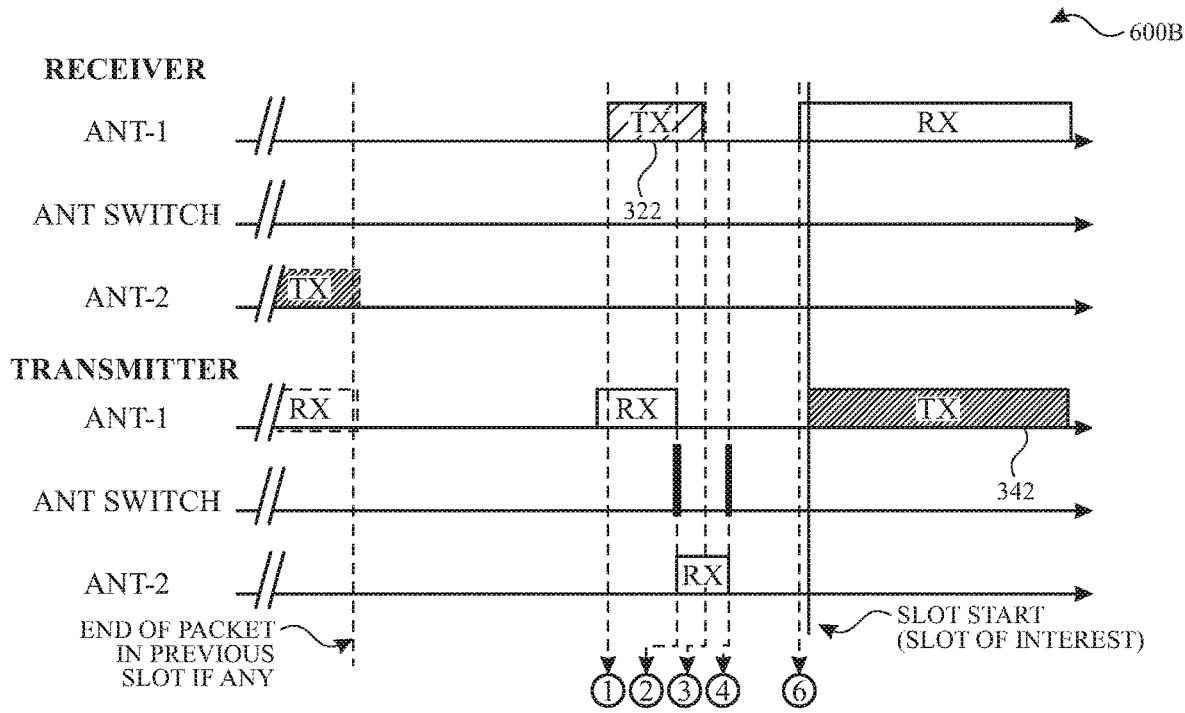

FIGS. 6A-6B illustrate diagrams of exemplary receiver-initiated training (RIT) schemes 600A and 600B, in accordance with one or more aspects of the subject technology. In the receiver-initiated training schemes 600A and 600B, various algorithms are followed at different time instances labeled with encircled numbers (e.g., 1 through 6 in FIG. 6A), which are described below. The receiver-initiated training schemes 600A of FIG. 6A is a RIT-I scheme, in which transmitter antenna training is performed.

At a time instance (1), on the receiver side, noise/interference per antenna is estimated, and the transmitter_txpwr_plus_noise_detla parameter is generated and imbedded in the corresponding field in the TX training packet 322 for transmission. The TX training packet 322 is transmitted from Ant-1 of the transmitter at the designated timing ts-1 within the IFS 320. On the transmitter side, the training packet received by Ant-1 of the receiver and estimates of $snr_{local\_11}$, $rssi_{local\_11}$, and $noise_{local\_11}$ are prepared.

At a time instance (2), on the transmitter side, the active antenna is switched from Ant-1 to Ant-2, and the reception of the TX training packet 322 continues and estimates of $snr_{local\_21}$, $rssi_{local\_21}$, $noise_{local\_21}$ are prepared. The parameter transmitter_txpwr_plus_noise_detla is obtained from the TX training packet 322.

At a time instance (3), on the receiver side, the active antenna is switched from Ant-1 to Ant-2 and transmission continues by transmitting the TX training packet 324. On the transmitter side, estimates of parameters $snr_{local\_22}$, $rssi_{local\_22}$, and $noise_{local\_22}$ are prepared.

At a time instance (4), on the transmitter side, the active antenna is switched from Ant-2 to Ant-1, the receiver continues to receive the TX training packet 324 and prepares estimates of parameters $snr_{local\_12}$, $rssi_{local\_12}$, and $noise_{local\_12}$, and obtains from the TX training packet 324 transmitter_txpwr_plus_noise_detla, if failed to obtain it from the TX training packet 322.

At a time instance (5), on the transmitter side, antenna selection schemes for the following scenarios (a, b, and c) are calculated according to the above discussed equations: (a) from remote TX antenna scheme k to local Rx antenna scheme p, according to (Eq. 1) above, (b) from local TX antenna scheme m to remote Rx antenna scheme i, according to (Eq. 2) above, and (c) from local TX antenna scheme n to send training response packet, according to (Eq. 5) above.

At a time instance (6), implicit training, the algorithm of which is fully described with respect to FIG. 9 below, can be used to select the best receiver antenna scheme. Transmitter will use the local TX scheme n of the (Eq. 5) above for transmission.

The receiver-initiated training scheme 600B is a variant of the receiver-initiated training scheme 600A, for receiver antenna training. The algorithms followed during shown time instances (e.g., (1), (2), (3), (4), and (6)) are similar to the corresponding time instances as described above with respect to receiver-initiated scheme 600A.

Figure 7:
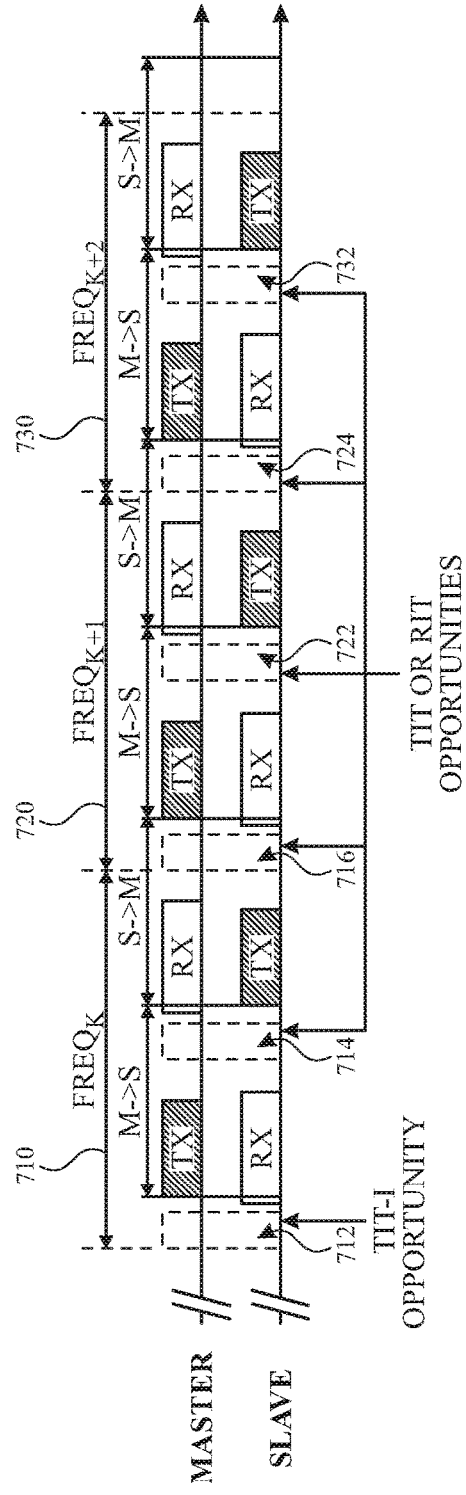
FIG. 7 is a diagram illustrating an example of a number of time slots of a master-slave transceiver system, in accordance with one or more aspects of the subject technology.

FIG. 7 is a diagram illustrating an example of a number of time slots of a master-slave transceiver system, in accordance with one or more aspects of the subject technology. The diagram in FIG. 7 is timing diagram showing time slots 710, 720, and 730. Each of the time slots 710, 720, and 730 includes a corresponding master-to-slave and slave-to-master time slot and is associated with a specific frequency (e.g., $freq_k$, $freq_{k+1}$, $freq_{k+2}$). During a master-to-slave time slot, the master (e.g., a local device) transmits to the slave (e.g., a remote device), whereas during a slave-to-master time slot, the slave transmits to the master. During the time slots 710, 720, and 730, training time intervals 712, 714, 716, 724, and 732 are provided. For example, the training time interval 712 can be used for TIT-I training scheme and training time intervals 714, 716, 724, and 732 can be used for transmitter-initiated training or receiver-initiated training schemes.

Figure 8:
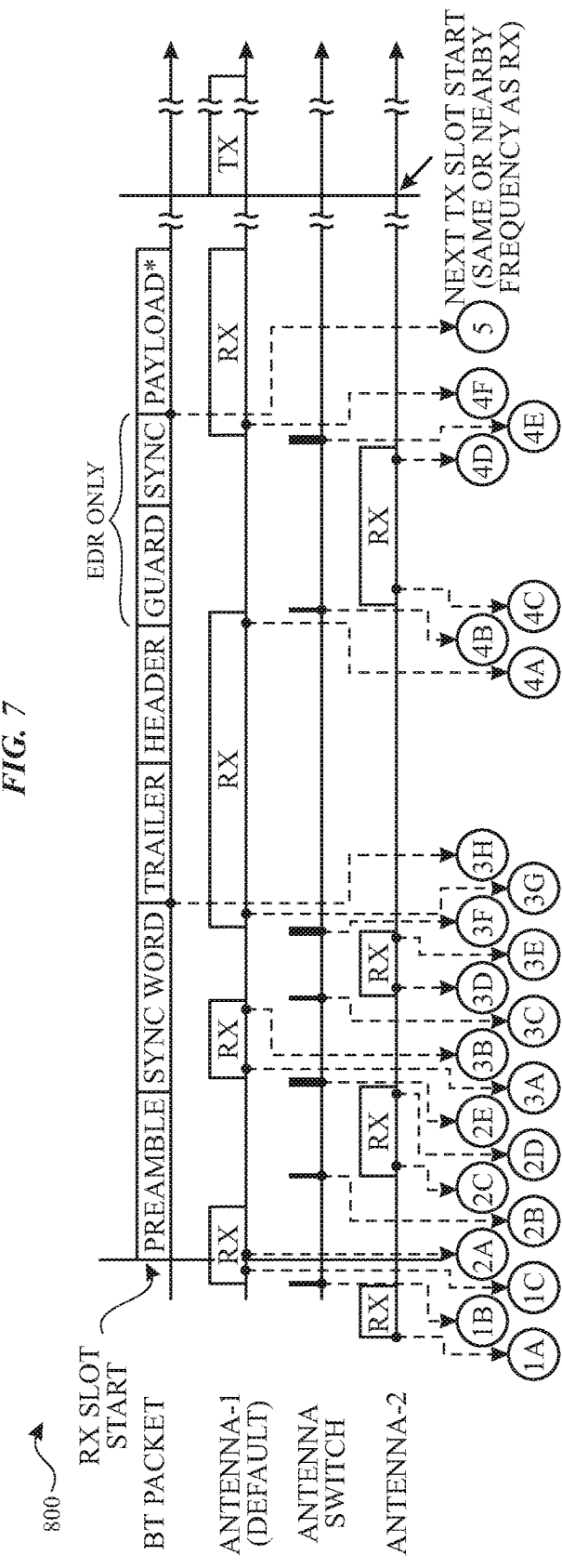
FIG. 8 is a diagram illustrating an exemplary Bluetooth per-packet antenna switch diversity implementation, in accordance with one or more aspects of the subject technology.

FIG. 8 is a diagram illustrating an exemplary Bluetooth per-packet antenna switch diversity implementation 800, in accordance with one or more aspects of the subject technology. In the antenna switch diversity implementation 800 various algorithms are followed at different time instances labeled with encircled numbers (e.g., 1a through 5 in FIG. 8), which are described below. The per-packet antenna training is performed during various fields (e.g., preamble, sync word, trailer, header, etc.) prior to the payload field of the actual packet. Before the actual packet arrives, noise or interference levels on both antennas are estimated to provide antennas switch decision factor related to noise or interference.

At a time instance (1a), the non-default antenna (e.g., Antenna-2) is the RX antenna and noise and/or interference are estimated based on RX gain and IQ samples.

At a time instance (1b), an antenna switch is performed and the default antenna becomes the RX antenna within a designated short period of time (e.g., less than about 1 µsec)

At a time instance (1c), noise and/or interference on the default antenna are estimated.

During preamble reception, RSSI on both antennas is estimated to provide switch decision factor related to RSSI.

At a time instance (2a), once a partial preamble sequence is detected (i.e., "01" or "10") the current antenna RSSI is calculated based on a gain state (e.g., from an applicable PGA and/or LNA of FIG. 2), baseband IQ samples, and other parameters. The gain state including relevant receiver chain settings for the current antenna are stored (e.g., in RAM 272 of FIG. 2).

At a time instance (2b), an antenna switch is performed and Antenna-2 becomes the RX antenna.

At a time instance (2c), the RX antenna continues to receive and calculate the current antenna RSSI over the remaining preamble sequence and/or initial bit of the sync word.

At a time instance (2d), the RSSI's associated with two antennas are compared and the antenna with the highest (RSSI-Noise) is selected as the target antenna at the end of preamble or beginning of sync word.

At a time instance (2e), only if the target antenna is not the current antenna, gain state for current antenna is stored and antenna is switched to the target antenna and the appropriate gain settings are applied to the applicable PGA and/or LNA of FIG. 2 based on previously stored gain state for the target antenna.

During Sync word reception, SNR (based on correlation output) on both antennas is estimated to provide switch decision factor related with SNR and/or sync.

At a time instance (3a), reception on the current antenna is continued, while continuously checking received sync bits (e.g., via a correlator) to see if the sync bits match the expected sync word for the initial designated length (e.g., first 6 bits). The gain state may be adjusted as needed during both preamble and SYNC reception. It is understood that for Bluetooth, sync can tolerate up to 7 bits error for accurate decision making.

At a time instance (3b), at the expected initial designated sync bits reception (e.g., at 6th sync bit reception), inspection is made to see if the received bits match the expected values. If matching exists, the SNR of the current antenna is calculated based on correlation output and other factors and the gain state is stored.

At a time instance (3c), the current antenna is switched at the expected designated initial sync bits reception (e.g. at 6th sync bit reception) within a designated short period of time (e.g. less than about 1 µsec), and the gain state is restored if needed.

At a time instance (3d), reception is continued on the current antenna.

At a time instance (3e), at the next designated segment of the expected sync word (e.g., at 13th sync bit time), inspection is made to see if the sync bits received on the current antenna match the expected section. If matching exists, the current antenna SNR is calculated. The SNR's associated with the two antennas are compared to select the antenna with the highest SNR as the target antenna. If neither antenna has a valid SNR value, the default antenna or the antenna with the highest (RSSI-noise) is set as the target antenna.

At a time instance (3f), only if the target antenna is not the current antenna, the RX antenna is switched to the target antenna and the appropriate gain is applied based on the previously stored gain state.

At a time instance (3g), reception in the rest of sync bits is continued.

At a time instance (3h), at the expected sync word reception completion (e.g., timeout or based on a correlator output), if the received SYNC bits match the expected sync word by more than a threshold number of bits (e.g., about 57 bits), then current antenna is set to default antenna for the next receive slot.

For an EDR packet (e.g., 500 of FIG. 5) only, during EDR guard/sync reception, Noise and RSSI on the other antenna are estimated to provide a switch decision factor, as described in time instances (4a) through (4f) below.

At a time instance (4a), RSSI, noise, or/and SNR are estimated at end of packet header on the current antenna and gain state is stored.

At a time instance (4b), the current antenna is switched to the other antenna at the beginning of EDR guard time. The gain state is restored if applicable.

At a time instance (4c), noise and RSSI are estimated during the rest of EDR guard time and initial EDR Sync, respectively.

At a time instance (4d), before sync reception ends, the antenna with the highest (RSSI-noise) is selected as the target antenna.

At a time instance (4e), only if the target antenna is not the current antenna, the current antenna is switched to the target antenna and the appropriate gain is applied based on previously stored gain state.

At a time instance (4f), reception is continued on the current antenna.

At a time instance (5), RSSI vs. channel frequency and Rx time table with per antenna RSSI and time stamp for future TX antenna selection are updated.

Figure 9:
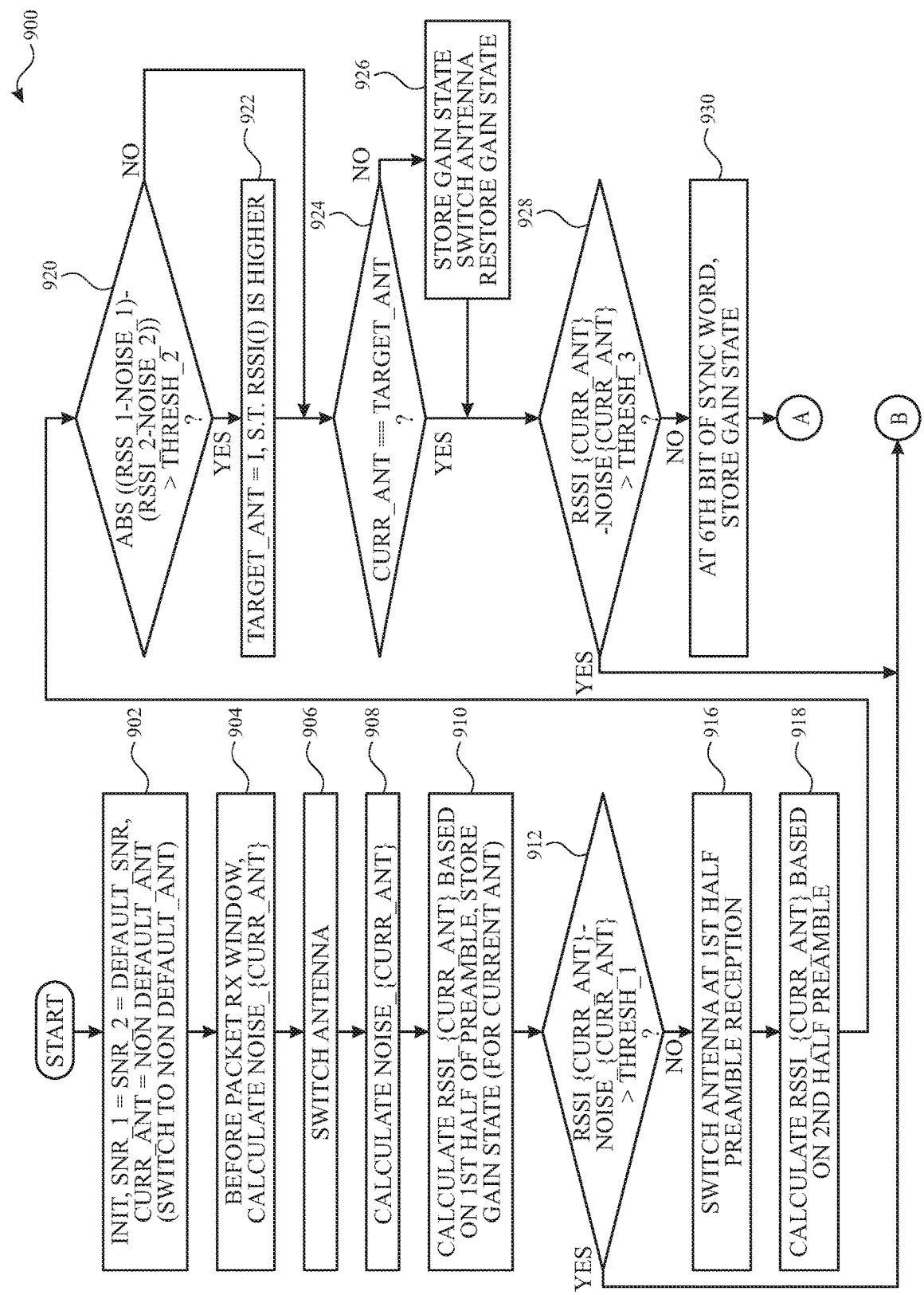
FIG. 9 is a flow diagram illustrating an example algorithm for a Bluetooth receive (RX) antenna switch diversity implementation, in accordance with one or more aspects of the subject technology.
Figure 9:
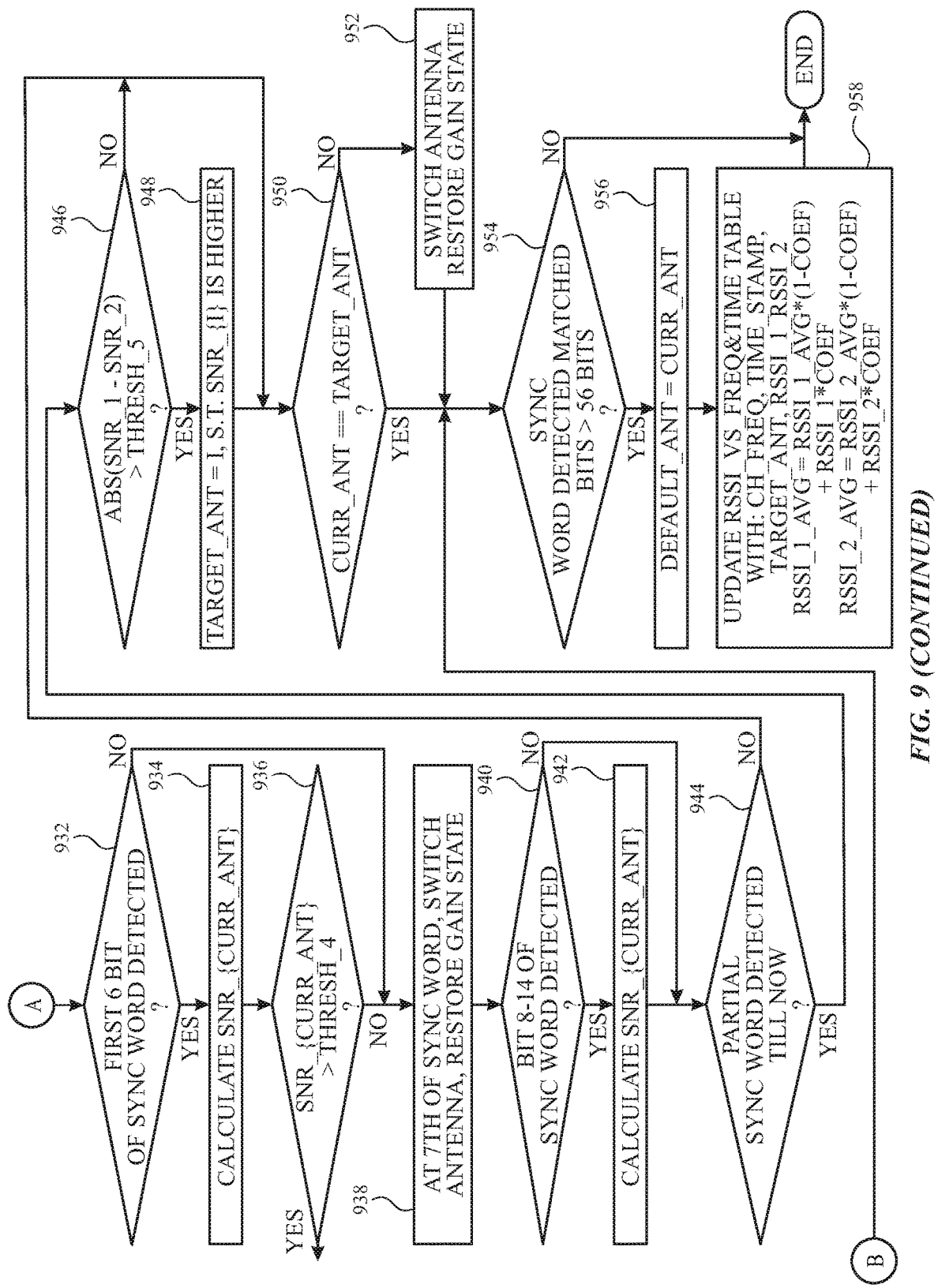

FIG. 9 is a flow diagram illustrating an algorithm for implementation of Bluetooth receive (RX) antenna switch diversity, in accordance with one or more aspects of the subject technology. The algorithm shown in the flow diagram 900 relates to an example RF transceiver with two antennas and a single radio circuit (e.g., 200 of FIG. 2) and the Bluetooth packet shown in FIG. 8. In some embodiments, the algorithm 900 can be executed by the baseband processor 260 of FIG. 2. The algorithm 900 begins with operation block 902, where initial values of the $snr_{-1}$ and $snr_{-1}$ are set to a default value (e.g., $snr_{default}$) and the current antenna is set to a non-default antenna.

At operation block 904, before a packet RX window, noise of the current antenna is determined, and at operation block 906, antenna is switched and the current antenna is set to the default antenna. At operation block 908, noise of the current antenna ($\text{noise}_{curr\text{-}ant}$) is determined, and at operation block 910, RSSI of the current antenna ($\text{rssi}_{curr\text{-}ant}$) is determined based on the content of the first half of the preamble field (see FIG. 8). At the control operation block 912, a value of ($\text{rssi}_{curr\text{-}ant}-\text{noise}_{curr\text{-}ant}$) is compared with a first threshold value (e.g., thresh-1) and if the value of ($\text{rssi}_{curr\text{-}ant}-\text{noise}_{curr\text{-}ant}$) is larger than thresh-1, the control is passed to control operation block 954. Otherwise, if the value of ($\text{rssi}_{curr\text{-}ant}-\text{noise}_{curr\text{-}ant}$) is not larger than thresh-1, the control is passed to operation block 916, where the current antenna is switched to the non-default antenna at the first half portion of the preamble reception.

At operation block 918, the RSSI of the current antenna ($\text{rssi}_{curr\text{-}ant}$) is determined based on the content of the second half of the preamble. At the control operation block 920, an absolute value of (($\text{rssi}_{-1}-\text{noise}_{-1}$)$-$($\text{rssi}_{-2}-\text{noise}_{-2}$)) is compared with a second threshold value (e.g., thresh-2) and if the absolute value of (($\text{rssi}_{-1}-\text{noise}_{-1}$)$-$($\text{rssi}_{-2}-\text{noise}_{-2}$)) is larger than thresh-2, control is passed to operation block 922. Otherwise, if the absolute value of (($\text{rssi}_{-1}-\text{noise}_{-1}$)$-$($\text{rssi}_{-2}-\text{noise}_{-2}$)) is not larger than thresh-2, the control is passed to operation block 924. At operation block 922, the target antenna is set to the antenna i (e.g., i=1 or 2) for which the ($\text{rssi}_{-i}-\text{noise}_{-i}$) is higher. At control operation block 924, if the current antenna is the target antenna control is passed to control operation block 928, otherwise, control is passed to operation block 926, where the gain state (e.g., gain of the LNA and PGA of FIG. 2) is stored, the current antenna is switched to the default antenna, and the gain state is restored.

At control operation block 928, a value of ($\text{rssi}_{curr\text{-}ant}-\text{noise}_{curr\text{-}ant}$) is compared with a third threshold value (e.g., thresh-3) and if the value of ($\text{rssi}_{curr\text{-}ant}-\text{noise}_{curr\text{-}ant}$) is larger than thresh-3, control is passed to control operation block 954. Otherwise, if the absolute value of ($\text{rssi}_{curr\text{-}ant}-\text{noise}_{curr\text{-}ant}$) is not larger than thresh-3, control is passed to operation block 930, where at the 6th bit of the sync word, the gain state is stored. At control operation block 932, it is determined whether the first 6 bits of the sync word are detected, and if detected, control is passed to operation block 934. Otherwise, if the first 6 bits of the sync word are not detected, control is passed to operation block 938. At operation block 934, a SNR value of the current antenna ($\text{snr}_{curr\text{-}ant}$) is determined. At control operation block 936, if $\text{snr}_{curr\text{-}ant}$ is larger than a fourth threshold value (e.g., thresh-4), control is passed to operation block 954. Otherwise, if $\text{snr}_{curr\text{-}ant}$ is not larger than thresh-4, the control is passed to operation block 938.

At operation block 938, at the $7^{th}$ bit of the sync word, the current antenna is switched to the non-default antenna and the gain state is restored. At control operation block 940, it is determined whether bits 8-14 of the sync word are detected or not. If the bits 8-14 of the sync word are detected, control is passed to control operation block 942. Otherwise, if the bits 8-14 of the sync word are not detected, control is passed to operation block 944. At operation block 942, the SNR value of the current antenna ($\text{snr}_{curr\text{-}ant}$) is determined. At control operation block 944, if an absolute value of ($\text{snr}_{-1}-\text{snr}_{-2}$) is larger than a fifth threshold value (e.g., thresh-5), control is passed to operation block 946. Otherwise, if the absolute value of ($\text{snr}_{-1}-\text{snr}_{-2}$) is not larger than thresh-5, control is passed to operation block 950.

At operation block 948, the target antenna is set to the antenna i (e.g., i=1 or 2) for which the $\text{snr}_{-i}$ is higher. At control operation block 950, it is determined whether the current antenna is the target antenna or not, and if the current antenna is the target antenna, control is passed to control operation block 954. Otherwise, if the current antenna is not the target antenna, control is passed to operation block 952, where the current antenna is switched to the default antenna and the gain state is restored. At control operation block 954, it is determined whether the sync word was detected with a count of matched bits greater than 56 or not. If the sync word was detected with the count of the matched bits greater than 56, control is passed to operation block 956. Otherwise, if the sync word was not detected with the count of the matched bits greater than 56, the algorithm 900 ends. At operation block 956, the current antenna is set to the default antenna, and finally at operation block 958, RSSI versus frequency and time table is updated with channel frequency, time stamp, target antenna, $\text{rssi}_{-1}$, $\text{rssi}_{-2}$, average $\text{rssi}_{-1}$ ($\text{rssi}_{-1\text{-}avg}$) is set to ($\text{rssi}_{-1\text{-}avg}$)*(1$-$C)+($\text{rssi}_{-1\text{-}avg}$)*C, and average $\text{rssi}_{-2}$ ($\text{rssi}_{-2\text{-}avg}$) is set to ($\text{rssi}_{-2\text{-}avg}$)*(1$-$C)+($\text{rssi}_{-2\text{-}avg}$)*C, wherein C is a suitable coefficient.

Figure 10:
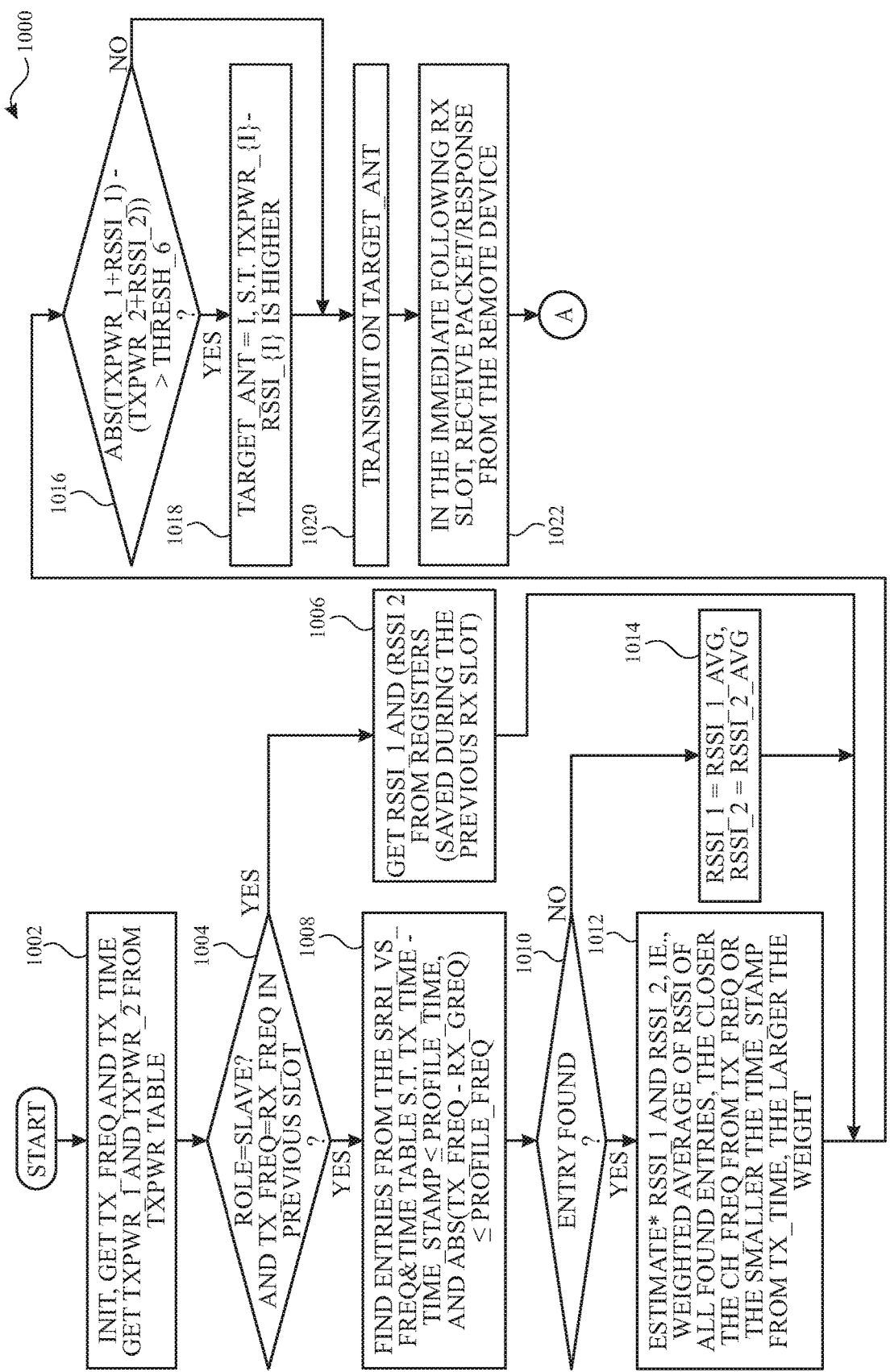
FIG. 10 is a flow diagram illustrating an example algorithm for implementation of Bluetooth transmit (TX) antenna switch diversity, in accordance with one or more aspects of the subject technology.
Figure 10:
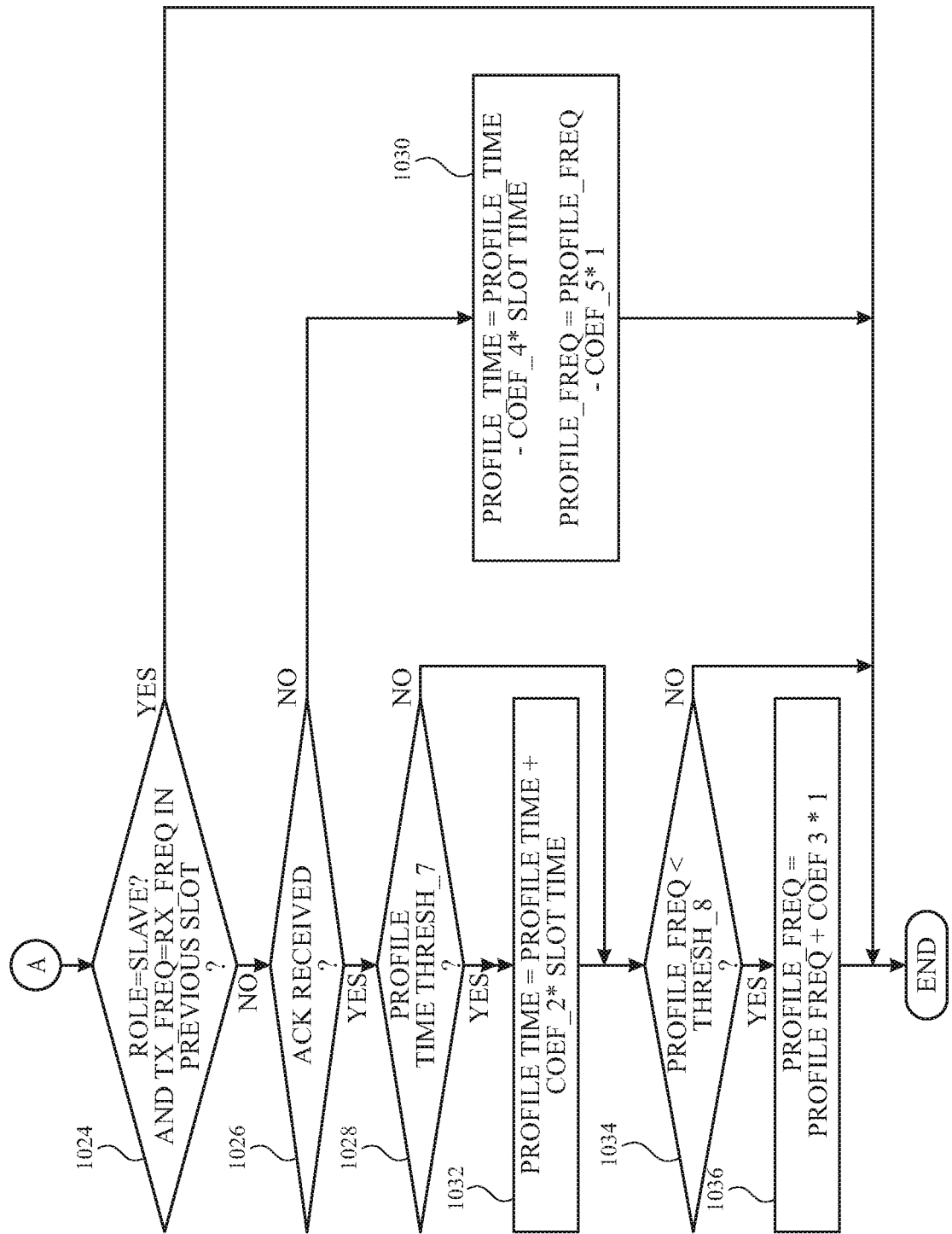

FIG. 10 is a flow diagram 1000 illustrating an algorithm for implementation of Bluetooth transmit (TX) antenna switch diversity, in accordance with one or more aspects of the subject technology. The algorithm shown in the flow diagram 1000 relates to an example RF transceiver with two antennas and a single radio circuit (e.g., 200 of FIG. 2) and the Bluetooth packet shown in FIG. 8. In some embodiments, the algorithm 1000 can be executed by the baseband processor 260 of FIG. 2. The algorithm 1000 begins with operation block 1002, where initial values of transmit frequency (tx_freq) and transmit time stamp (tx_time) are obtained and transmit power values txpwr-1 and txpwr-2 are retrieved from transmit power table.

At control operation block 1004, if the role of the local device is slave and the tx_freq=rx_freq in previous slot, the control is passed to operation block 1006. Otherwise, if the role of the device is master or the tx_freq≠rx-freq in previous slot, the control is passed to operation block 1008. At operation block 1008, an RSSI versus frequency and time table is search for an entry for which a values of (tx_time-time_stamp) is less than or equal to a profile_time and an absolute value of (tx_freq-rx_freq) is less than or equal to a profile_freq. At operation block 1006, values of $\text{rssi}_{-1}$ and $\text{rssi}_{-2}$ are obtained from registers, in which values were saved during the previous RX slot, and forwarded to control operation block 1016.

At control operation block 1010, if the entry was found, control is passed to operation block 1012, otherwise the control is passed to operation block 1014. At operation block 1012, $\text{rssi}_{-1}$ and $\text{rssi}_{-2}$ are estimated by determining a weighted average of RSSI of all found entries (in operation block 1008). The values of the weights depend on the channel frequency and transmit time. For example, the smaller the values of (tx_stamp-tx_time) and (ch_freq-tx_freq) the smaller the values of the weights. At operation block 1014, values of $\text{rssi}_{-1}$ and $\text{rssi}_{-2}$ are set to $\text{rssi}_{-1\text{-}avg}$ and $\text{rssi}_{-2\text{-}avg}$, respectively, and results are forwarded to control operation 1016.

At control operation block 1016, an absolute value of (($\text{txpwr}_{-1}+\text{rssi}_{-1}$)$-$($\text{txpwr}_{-2}+\text{rssi}_{-2}$)) is compared with a sixth threshold value (thresh_6), and if the absolute value of (($\text{txpwr}_{-1}+\text{rssi}_{-1}$)$-$($\text{txpwr}_{-2}+\text{rssi}_{-2}$)) is larger than thresh_6, control is passed to operation block 1018. Otherwise, if the absolute value of (($\text{txpwr}_{-1}+\text{rssi}_{-1}$)$-$($\text{txpwr}_{-2}+\text{rssi}_{-2}$)) is not larger than thresh_6, control is passed to operation block 1020. At operation block 1018, antenna_i (i=1 or 2) is set as the target antenna, where i is an index for which ($txpwr_i$-$rssi_i$) has a higher value. At operation block 1020, the target antenna is used for transmission. At operation block 1022, a packet or a response is received from a remote device, in the time stance immediately following the RX slot.

At control operation block 1024, if the role of the local device is slave and the tx_freq=rx_freq in previous slot, the algorithm ends. Otherwise, if the role of the local device is master or the tx_freq≠rx_freq in previous slot, control is passed to operation block 1026. At control operation block 1026, if an acknowledgement (ACK) signal is received control is passed to control operation block 1028. Otherwise, if no ACK) signal is not received control is passed to operation block 1030. At control operation block 1028, if profile_time is less than a $7^{th}$ threshold value (thresh_7), control is passed to operation block 1032. Otherwise, if profile_time is not less than thresh_7, control is passed to operation block 1034. At operation block 1030, profile_time is set to profile_time-coef_4*slot time and profile_freq is set to profile_freq-coef_5*1 and the algorithm ends. At operation block 1032, profile_time is set to profile_time+coef_2*slot time. At control operation block 1034, if profile_freq is smaller than an $8^{th}$ threshold (thrsh_8), control is passed to operation block 1036. Otherwise, the algorithm ends. Finally, at operation block 1036, profile_freq is set to profile_freq+coef_3*1 and the algorithm ends.

FIG. 11A is a table 1100A illustrating example values of receiver signal strength indicator (RSSI) versus frequency and time, in accordance with one or more aspects of the subject technology. The entries of table 1100A include channel number (ch_num), channel frequency (ch_freq) in MHz, time stamp (slot), target antenna (target_ant) (e.g., 1 or 2 for antenna_1 (Ant-1) and antenna-2 (Ant-2), respectively), RSSI of antenna-1 ($rssi_1$) and RSSI of antenna-2 ($rssi_2$) in dB, which were used in the above discussed algorithms.

FIG. 11B is a table 1100B illustrating example values of per-antenna TX power, in accordance with one or more aspects of the subject technology. The entries of table 1100B include use case (use_case), transmit power of antenna-1 (txpwr_1) in dBm, and transmit power of antenna-2 (txpwr_2) in dBm, which were used in the above discussed algorithms. The use cases (e.g., 1, 2, 3 . . . ) correspond to various scenarios regarding states (e.g., on or off) of Wi-Fi and cellular functionalities or power saving mode, as shown in a comment column.

Figure 12:
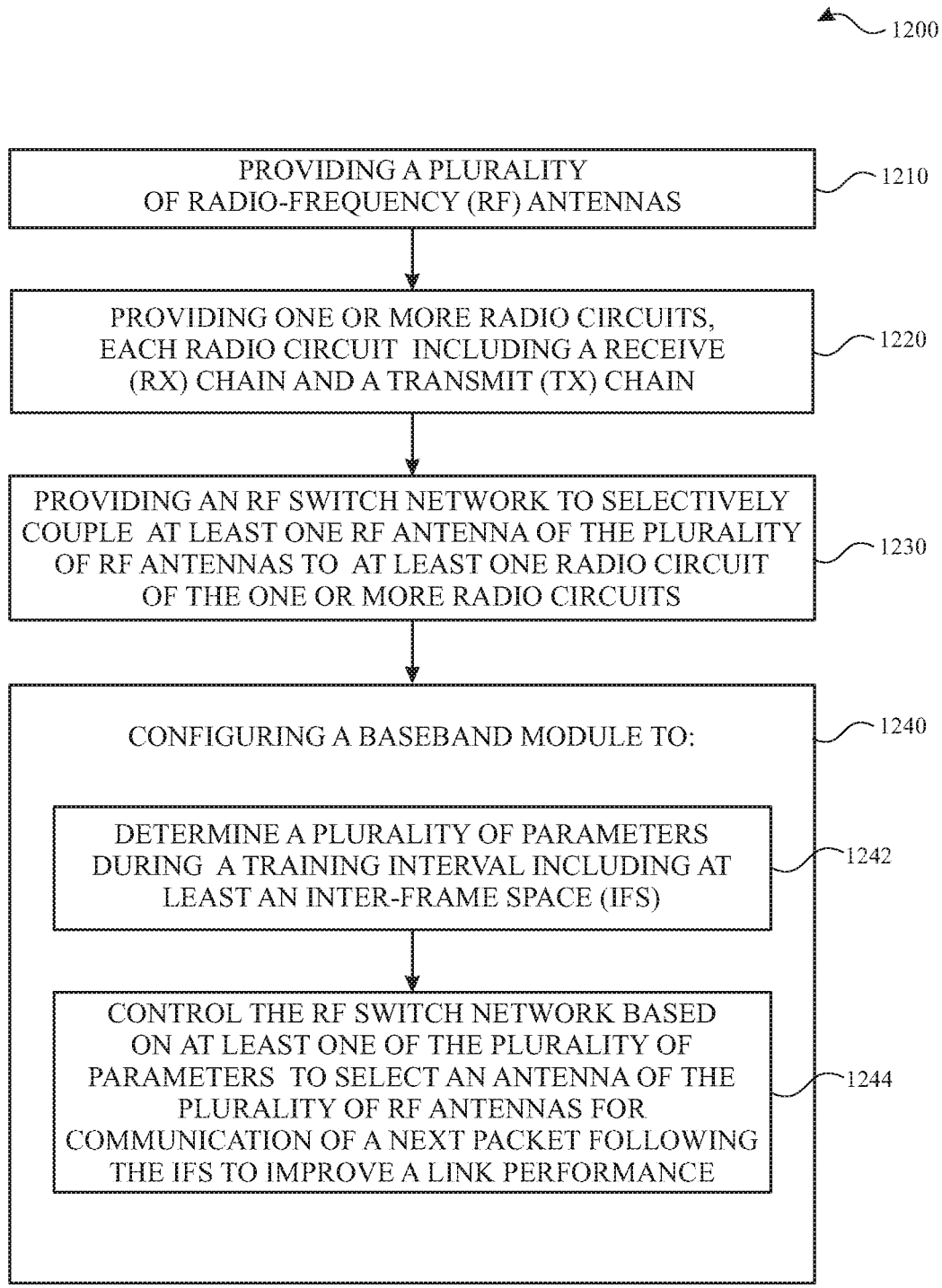
FIG. 12 is a flow diagram illustrating an example method for transmitter and receiver per-packet antenna training, in accordance with one or more aspects of the subject technology.

FIG. 12 is a flow diagram illustrating an example of a method 1200 for transmitter and receiver per-packet antenna training, in accordance with one or more aspects of the subject technology. The method 1200 start with providing a number of radio-frequency (RF) antennas (e.g., 202 and 204 of FIG. 2) (1210). One or more radio circuits (e.g., 220 of FIG. 2) are provided, each radio circuit includes a receive (RX) chain (e.g., 240 of FIG. 2) and a transmit (TX) chain (e.g., 230 of FIG. 2) (1220). An RF switch network (e.g., 210 of FIG. 2) is provided to selectively couple at least one RF antenna to at least one radio circuit (1230). A baseband processor (e.g., 260 of FIG. 2) is configured (1240) to determine a plurality of parameters (e.g., entries of Tables 1100A and 1100B of FIGS. 11A and 11B) during a training interval including at least an inter-frame space (IFS) (e.g., 320 of FIG. 3A) (1242), and to control the RF switch network (e.g., by 262 and 264 of FIG. 2) based at least one of the plurality of parameters to select an antenna for communication of a next packet (e.g., 342 of FIG. 3A) following the IFS to improve a link performance (1244).

Figure 13:
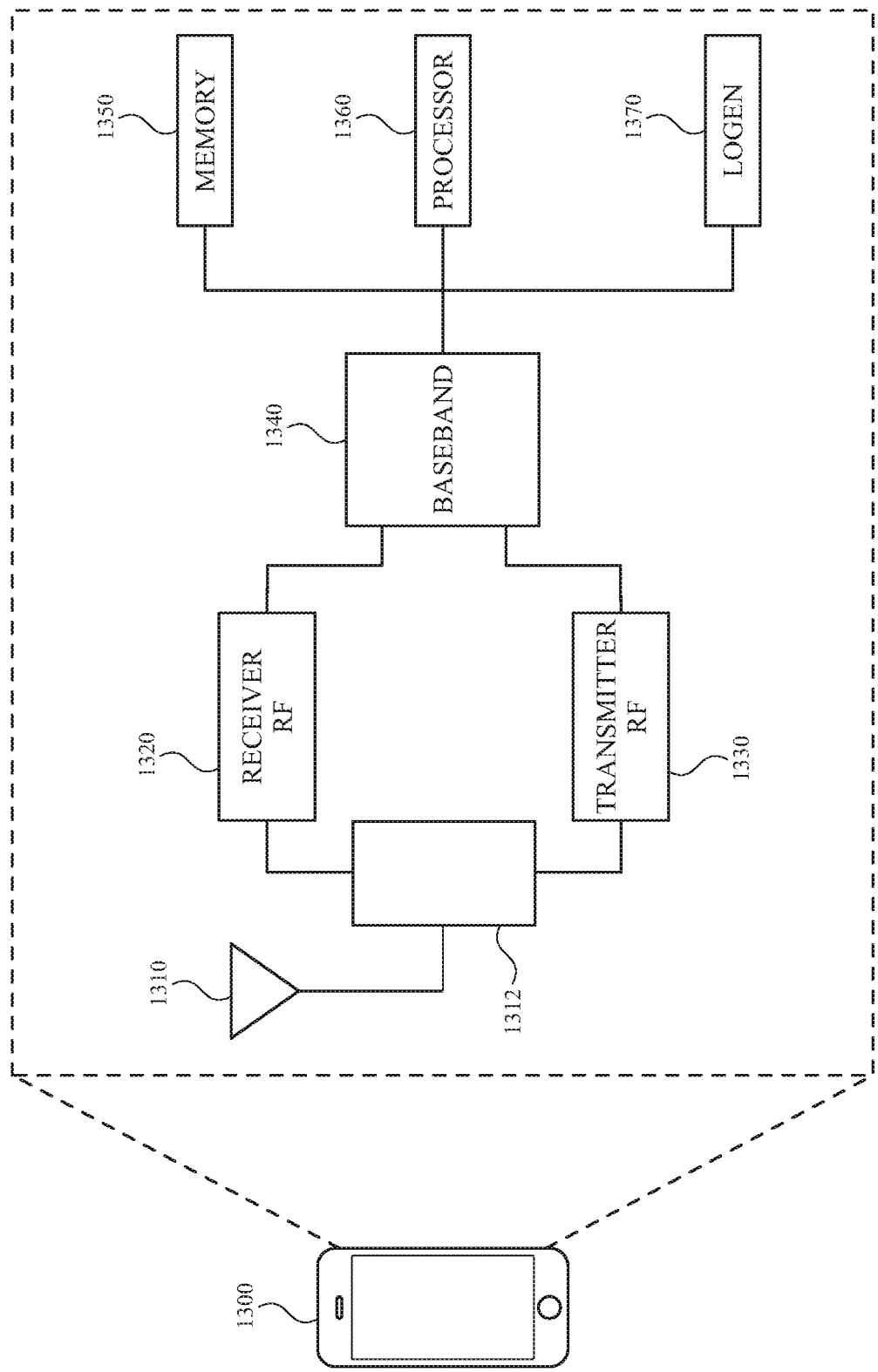
FIG. 13 is a block diagram illustrating an example wireless communication device, in accordance with one or more implementations of the subject technology.

FIG. 13 is a block diagram illustrating an example wireless communication device 1300, in accordance with one or more implementations of the subject technology. The wireless communication device 1300 may comprise a radio-frequency (RF) antenna 1310, a receiver 1320, a transmitter 1330, a baseband processing module 1340, a memory 1350, a processor 1360, and a local oscillator generator (LOGEN) 1370. In various embodiments of the subject technology, one or more of the blocks represented in FIG. 13 may be integrated on one or more semiconductor substrates. For example, the blocks 1320-1370 may be realized in a single chip or a single system on a chip, or may be realized in a multi-chip chipset.

The receiver 1320 may comprise suitable logic circuitry and/or code that may be operable to receive and process signals from the RF antenna 1310. The RF antennas may represent antennas 202 and 204 of FIG. 2. The receiver 1320 may, for example, be operable to amplify and/or down-convert received wireless signals. In various embodiments of the subject technology, the receiver 1320 may be operable to cancel noise in received signals and may be linear over a wide range of frequencies. In this manner, the receiver 1320 may be suitable for receiving signals in accordance with a variety of wireless standards, Wi-Fi, WiMAX, Bluetooth, and various cellular standards. In various embodiments of the subject technology, the receiver 1320 may not require any SAW filters and few or no off-chip discrete components such as large capacitors and inductors.

The transmitter 1330 may comprise suitable logic circuitry and/or code that may be operable to process and transmit signals from the RF antenna 1310. The transmitter 1330 may, for example, be operable to up-convert baseband signals to RF signals and amplify RF signals. In various embodiments of the subject technology, the transmitter 1330 may be operable to up-convert and amplify baseband signals processed in accordance with a variety of wireless standards. Examples of such standards may include Wi-Fi, WiMAX, Bluetooth, and various cellular standards. In various embodiments of the subject technology, the transmitter 1330 may be operable to provide signals for further amplification by one or more power amplifiers.

The duplexer 1312 may provide isolation in the transmit band to avoid saturation of the receiver 1320 or damaging parts of the receiver 1320, and to relax one or more design requirements of the receiver 1320. Furthermore, the duplexer 1312 may attenuate the noise in the receive band. The duplexer may be operable in multiple frequency bands of various wireless standards.

The baseband processing module 1340 may comprise suitable logic, circuitry, interfaces, and/or code that may be operable to perform processing of baseband signals. The baseband processing module 1340 may, for example, analyze received signals and generate control and/or feedback signals for configuring various components of the wireless communication device 1300, such as the receiver 1320. The baseband processing module 1340 may be operable to encode, decode, transcode, modulate, demodulate, encrypt, decrypt, scramble, descramble, and/or otherwise process data in accordance with one or more wireless standards. In some embodiments, the baseband processing module 1340 may perform the functionalities of the baseband processor 260 of FIG. 2. As described above.

The processor 1360 may comprise suitable logic, circuitry, and/or code that may enable processing data and/or controlling operation blocks of the wireless communication device 1300. In this regard, the processor 1360 may be enabled to provide control signals to various other portions of the wireless communication device 1300. The processor 1360 may also control transfers of data between various portions of the wireless communication device 1300. Additionally, the processor 1360 may enable implementation of an operating system or otherwise execute code to manage operation blocks of the wireless communication device 1300.

The memory 1350 may comprise suitable logic, circuitry, and/or code that may enable storage of various types of information such as received data, generated data, code, and/or configuration information. The memory 1350 may comprise, for example, RAM, ROM, flash, and/or magnetic storage. In various embodiment of the subject technology, information stored in the memory 1350 may be utilized for configuring the receiver 1320 and/or the baseband processing module 1340. The memory 1350 may include the RAM 272 and the ROM 274 of FIG. 2 and may store tables 1100A and 1100B of the subject disclosure.

The local oscillator generator (LOGEN) 1370 may comprise suitable logic, circuitry, interfaces, and/or code that may be operable to generate one or more oscillating signals of one or more frequencies. The LOGEN 1370 may be operable to generate digital and/or analog signals. In this manner, the LOGEN 1370 may be operable to generate one or more clock signals and/or sinusoidal signals. Characteristics of the oscillating signals such as the frequency and duty cycle may be determined based on one or more control signals from, for example, the processor 1360 and/or the baseband processing module 1340.

In operation block, the processor 1360 may configure the various components of the wireless communication device 1300 based on a wireless standard according to which it is desired to receive signals. Wireless signals may be received via the RF antenna 1310 and amplified and down-converted by the receiver 1320. The baseband processing module 1340 may perform noise estimation and/or noise cancellation, decoding, and/or demodulation of the baseband signals. In this manner, information in the received signal may be recovered and utilized appropriately. For example, the information may be audio and/or video to be presented to a user of the wireless communication device, data to be stored to the memory 1350, and/or information affecting and/or enabling operation block of the wireless communication device 1300. The baseband processing module 1340 may modulate, encode and perform other processing on audio, video, and/or control signals to be transmitted by the transmitter 1330 in accordance with various wireless standards.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

The predicate words "configured to", "operable to", and "programmed to" do not imply any particular tangible or intangible modification of a subject, but, rather, are intended to be used interchangeably. For example, a processor configured to monitor and control an operation block or a component may also mean the processor being programmed to monitor and control the operation block or the processor being operable to monitor and control the operation block. Likewise, a processor configured to execute code can be construed as a processor programmed to execute code or operable to execute code.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "example" is used herein to mean "serving as an example or illustration." Any aspect or design described herein as "example" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A wireless communication device, the device comprising:

a plurality of radio-frequency (RF) antennas;

one or more radio circuits, each radio circuit including a receive (RX) chain configured to process RX signals and a transmit (TX) chain configured to process TX signals;

an RF switch network configurable to couple at least one RF antenna of the plurality of RF antennas to at least one radio circuit of the one or more radio circuits; and a baseband processor configured to control a configuration of the RF switch network, wherein the baseband processor is configured to determine a plurality of parameters based on one or more antenna training packets communicated between the wireless communication device and a remote device during an inter-frame space (IFS) between first and second standard packets, and to control the RF switch network based on at least one of the plurality of parameters, the plurality of parameters including at least a TX power associated with a local TX selection scheme, a received signal strength indicator (RSSI) associated with a local RX selection scheme, and a TX power plus noise delta between antennas associated with a remote TX selection scheme determined by a baseband processor of the remote device; and wherein the configuration of the RF switch network is based at least on the determined plurality of parameters and is employed for selection of an antenna of the plurality of RF antennas to improve a link performance when used for communication of the second standard packet following the IFS.

2. The device of claim 1, wherein the baseband processor is configured to execute a training scheme to transmit or receive the one or more antenna training packets, wherein the training scheme includes a transmitter-initiated training scheme and a receiver-initiated training scheme.

3. The device of claim 2, wherein the transmitter-initiated training scheme is executed to train at least one of a TX antenna selection of the device and an RX antenna selection of a remote device, and wherein the receiver-initiated training scheme is executed to train the TX antenna selection of the remote device.

4. The device of claim 2, wherein an antenna training packet of the one or more antenna training packets includes a training preamble and a training header.

5. The device of claim 1, wherein the baseband processor is configured to determine the plurality of parameters during a training interval comprising the IFS and wherein the training interval is extendable to a portion of a time slot of the next packet associated with packet components preceding a payload of the next packet.

6. The device of claim 1, wherein the one or more radio circuits comprise one radio circuit, and the plurality of RF antennas comprise two antennas.

7. The device of claim 1, wherein the plurality of parameters further comprise at least some of a receiver signal-to-noise ratio (SNR), noise, and an interference.

8. The device of claim 1, wherein the plurality of parameters further include a quality parameter that indicates noise and interference associated with the local RX scheme.

9. A wireless communication system, the system comprising:
a first communication device comprising:
two or more radio-frequency (RF) antennas;
at least one transceiver circuit including a receive (RX) path and a transmit (TX) path;
an RF switch network provided between the two or more RF antennas and the at least one transceiver circuit; and
a baseband processor to control a configuration of the RF switch network to couple at least one RF antenna of the two or more RF antennas to selected ones of the at least one transceiver circuit,
wherein the baseband processor is configured to determine a plurality of parameters based on one or more antenna training packets communicated during a training interval comprising an inter-frame space between first and second standard packets of a plurality of standard packets, and to control the configuration of the RF switch network based on at least one of the plurality of parameters,
wherein the plurality of parameters include a quality parameter that indicates noise and interference associated with a local RX scheme, a TX power associated with a local TX selection scheme, and a TX power plus noise delta between antennas associated with a remote TX selection scheme determined by a baseband processor of a second communication device, and
wherein the configuration of the RF switch network is employed for selection of an antenna of the two or more RF antennas to improve a link performance when used for communication of the second standard packet following the IFS.

10. The system of claim 9 wherein the baseband processor is configured to transmit or receive the one or more antenna training packets by executing a training scheme during the training interval; and wherein the training scheme includes a transmitter-initiated training scheme and a receiver-initiated training scheme.

11. The system of claim 10, wherein the transmitter-initiated training scheme is executed to train at least one of a TX antenna selection of the first communication device and an RX antenna selection of the second communication device in wireless communication with the first communication device; and wherein the receiver-initiated training scheme is executed to train the TX antenna selection of the second communication device.

12. The system of claim 10, wherein an antenna training packet of the one or more antenna training packets is structured to include at least a training preamble and a training header.

13. The system of claim 9, wherein the baseband processor is configured to extend the training interval to continue during a portion of a time slot of the next packet preceding a payload of the standard packet.

14. The system of claim 9, wherein the at least one transceiver circuit comprises one transceiver circuit, and the two or more RF antennas comprise two RF antennas.

15. A method comprising:
communicating a plurality of packets; and
during a training interval including an interval between two successive packets of the plurality of packets, performing antenna diversity training to select a transmit (TX) antenna and a receive (RX) antenna among a plurality of antennas of a local communication device to create a desired link between the local communication device and a remote communication device, by:
determining, prior to or during the training interval, a first set of radio-frequency (RF) parameters of the local communication device, wherein the first set of RF parameters comprises a TX power associated with a local TX antenna selection scheme and a received signal strength indicator (RSSI) associated with a local RX antenna scheme, and wherein determining the first set of RF parameters is performed by a baseband processor of the local communication device;
receiving, during the interval between the two successive packets of the plurality of packets at the local communication device, a second set of RF parameters of the remote communication device included in at least a training synch word of one or more training packets, wherein the second set of RF parameters include a TX power plus noise delta between antennas associated with a remote TX selection scheme, and wherein determining the second set of RF parameters is performed by a baseband processor of the remote communication device; and
determining the TX and RX antennas based on the first and second set of RF parameters.

16. The method of claim 15, wherein the first set of RF parameters comprises a signal-to-interference-plus-noise ratio (SINR) associated with the local RX antenna scheme and a remote TX antenna scheme.

17. The method of claim 16, wherein performing the antenna diversity training includes a transmitter-initiated training scheme and a receiver-initiated training scheme.

18. The method of claim 17, wherein the transmitter-initiated training scheme comprises training at least one of a TX antenna selection of the local communication device and an RX antenna selection of the remote communication device.

19. The method of claim 17, wherein the receiver-initiated training scheme comprises training a TX antenna selection of the remote communication device, and wherein training interval further comprise a portion of a time slot of a next packet preceding a payload of the next packet.

* * * * *